United States Patent [19]

Kitami et al.

[11] Patent Number: 5,602,346
[45] Date of Patent: Feb. 11, 1997

[54] MASS FLOWMETER CONVERTER

[75] Inventors: Hirokazu Kitami; Toshihiro Abe, both of Tokyo, Japan

[73] Assignee: Oval Corporation, Tokyo, Japan

[21] Appl. No.: 455,420

[22] Filed: May 31, 1995

[30] Foreign Application Priority Data

| Jun. 6, 1994 | [JP] | Japan | 6-123577 |
| Jun. 20, 1994 | [JP] | Japan | 6-137229 |
| Dec. 15, 1994 | [JP] | Japan | 6-311402 |
| Feb. 9, 1995 | [JP] | Japan | 7-021536 |
| May 2, 1995 | [JP] | Japan | 7-108901 |

[51] Int. Cl.$^6$ ................................ G01F 1/84
[52] U.S. Cl. ................ 73/861.356; 73/861.357
[58] Field of Search ................ 73/861.358, 861.356, 73/861.357; 324/684, 678

[56] References Cited

U.S. PATENT DOCUMENTS

| 4,187,721 | 2/1980 | Smith . | |
| 4,422,338 | 12/1983 | Smith . | |
| 4,817,448 | 4/1989 | Hargarten et al. | 73/861.356 |
| 5,024,104 | 6/1991 | Dames | 73/861.357 |
| 5,295,084 | 3/1994 | Arunachalam et al. | 73/32 A |
| 5,398,554 | 3/1995 | Ogawa et al. | 73/861.357 |
| 5,469,748 | 11/1995 | Kalotay | 73/861.356 |

FOREIGN PATENT DOCUMENTS

| 0261435 | 3/1988 | European Pat. Off. . |
| 0275367 | 7/1988 | European Pat. Off. . |
| 0375300 | 6/1990 | European Pat. Off. . |
| 0598287 | 5/1994 | European Pat. Off. . |
| 88/03642 | 5/1988 | WIPO . |
| 92/19940 | 11/1992 | WIPO . |

*Primary Examiner*—Elizabeth L. Dougherty
*Assistant Examiner*—Harshad Patel
*Attorney, Agent, or Firm*—Jordan and Hamburg

[57] ABSTRACT

A mass flowmeter converter detects a Coriolis force acting on a flow tube driven at a constant frequency as a time difference ΔT between two displacement signals detected at symmetrically opposed positions. A mass flow proportional to the time difference ΔT is determined. Sine-wave signals differing in phase and at a constant amplitude are detected paired detecting coils and provide input signals which are pulses having specified pulse width values equal to a leading time (T+ΔT) and a lagging time (T+ΔT). N number of pulses (T+ΔT) and N number of pulses (T−ΔT) are sampled simultaneously by respective integrators having the same time constant, and by using a reference power source a time difference of zero-crossing voltages and a time difference signal enlarged by 2N times is detected. Furthermore, a small time measurement error due to drifts of the charging-discharging circuit is compensated by alternating respective integrators.

9 Claims, 12 Drawing Sheets

MASS FLOWMETER CONVERTER

BACKGROUND OF THE INVENTION

The present invention relates to a mass flowmeter converter and, more particularly, to a converter which is adapted for use in a low detection sensitivity mass flowmeter such as a straight tube type Coriolis flowmeter, and which can measure a Coriolis force acting on a flow tube of a Coriolis flowmeter, which is proportional to mass flowrate, as a time difference at high sensitivity with no transit-time change due to a drift of an operational circuit.

A Coriolis flowmeter is a well known mass flowmeter which is based upon the fact that when fluid flows in a flow tube supported at both ends on supporting members and said tube is driven with an alternate, oscillation at its center portion in the direction perpendicular to its axis, a phase difference is produced between two symmetrically opposite positions on the flow tube and the phase difference is proportional to a mass flow rate. In practice, a driving coil to be excited by a drive circuit is provided in the center of a flow tube supported at both ends on supports and two detecting coils are arranged at symmetrically opposite positions between the center portion and both ends of the flow tube. A signal of a phase difference proportional to a mass flow rate is produced by the action of a Coriolis force and is detected. A mass flow is determined from the phase difference value. If a driving oscillation frequency is supposed to be constant, a phase difference signal can be detected as a time difference signal obtained when the flow tube passes a standard line at symmetrical positions.

When a flow tube supported at both ends on supports is driven with an alternate natural oscillation frequency at its center portion in the direction perpendicular to its axis, a constant driving frequency which corresponds to a size and material of the flow tube and a density of the measurable fluid is obtained at a small driving energy. Therefore, the fluid density corresponding to the driving frequency is determined. For this reason, it is usually adopted to drive the flow tube at the natural oscillation frequency.

A circuit for driving the flow tube at the natural oscillation frequency is a positive feedback circuit that controls an input signal at a constant level by inputting a sine-wave signal output from a detecting coil into a driving circuit.

Accurate measurement of a mass flow by a Coriolis mass flowmeter thus constructed depends upon stable and accurate measurement of a time difference signal. The time difference is measured by counting clock pulses at a specified frequency during the time difference. For instance, in case of a straight tube type Coriolis flowmeter having a high rigidity, a phase difference signal produced by the action of a Coriolis force is small. Therefore, a time difference value of the time difference signal proportional to the phase difference signal is correspondingly small. Such a small time difference may be detected at an accuracy necessary for further measurement in the Coriolis mass flowmeter by using a clock pulse generator of 100 MHz or similar level, which is, however, expensive to use. To stably measure a small value of time difference at a high accuracy, there is still a problem concerning stability of the time difference detecting circuit itself, e.g., the occurrence of a zero drift may reduce detection accuracy. Furthermore, the Coriolis flowmeter itself may be affected by an expansion of measurable fluid due to temperature change.

SUMMARY OF THE INVENTION

A primary object of the present invention is to provide a mass flowmeter converter whereby a Coriolis force acting on a flow tube being alternately driven with a constant frequency about its supporting points is detected as a time difference $\Delta T$ between paired displacement signals detected at symmetrically opposed positions to determine a mass flowrate proportional to a time difference $\Delta T$, wherein detecting coils output respective sine-wave signals having different phases at a constant amplitude, one of which is converted into a trapezoidal wave signal which is a voltage having an even height in positive and negative directions relative to a reference time axis and having a slope of time T. The other sine-wave is converted into a trapezoidal wave signal having a time difference $\Delta T$ proportional to a Coriolis force. From the respective trapezoidal wave signals are selected: pulses having specified wave height values (T+$\Delta T$) and (T–$\Delta T$) respectively and having specified pulse width values being equal to a leading time (T+$\Delta T$) and a lagging time (T–$\Delta T$) from the respective trapezoidal wave signals are determined as input pulses; N pieces of pulses (T+$\Delta T$) and N pieces of pulses (T–$\Delta T$) are sampled simultaneously into respective integrators of the same time constant; the respective charge after being charged are discharged by using a reference power source and a time difference of zero-crossing voltages is measured, and a time difference signal enlarged by 2N times is detected. Thus, an accurate sensitivity mass flowrate is attained even when there is little flow change.

Another object of the present invention is to provide a mass flowmeter converter whereby in a usual measurement, pulses of (T+$\Delta T$) and pulses of (T–$\Delta T$) each by N pieces are applied to integrators having the same time constant for charging and discharging and, in testing, pulses of (T+$\Delta T$) and pulses of (T–$\Delta T$) are switched to be applied to different side integrators and a time deviation $\Delta T$ produced between respective 2N$\Delta T$ is detected and stored. When a time deviation occurs, the time deviation is corrected by the stored time deviation value, thereby a stable mass flow measuring signal is output over an extended period of use.

Another object of the present invention is to provide a mass flowmeter converter which is capable of measuring a time difference $\Delta T$ at high accuracy by charging and discharging N pulses of (T+$\Delta T$) and N pulses of (T–$\Delta T$) and characterized in that a small time measurement error due to drifts of the charging-discharging circuit which are charged with each N pieces of respective pulses of (T+$\Delta T$) and (T–$\Delta T$) can be compensated by switching the charging-discharging circuits every charge-discharge cycle so as to allow N pulses of (T+$\Delta T$) and N pulses of (T–$\Delta T$) to enter in different circuits every cycle, thereby stable and accurate time-difference measurements can be conducted over an extended period of use.

Another object of the present invention is to provide a mass flowmeter converter for use in a Coriolis flowmeter having a flow tube supported at least two points, which detects a Coriolis force, acting on the flow tube when the flow tube is driven with a specified natural oscillation frequency about the supporting points, as a phase difference, measuring a time difference corresponding to the detected phase difference, characterized in that since a natural frequency may vary depending upon fluid density and flow tube size and a zero drift proportional to a reciprocal of the natural frequency is produced, the natural frequency is detected, a reciprocal number of the natural frequency detected for the time difference is calculated and the measured time difference is compensated for the zero point drift calculated for the natural frequency to attain a high accuracy of detecting mass flow of variety of fluid.

Another object of the present invention is to provide a mass flowmeter converter having a simple construction and a high accuracy, wherein an integrator is charged with N pulses of (T+ΔT) having a specified peak value and then the charge voltage is discharged by N pulses of (T−ΔT) having a different peak value and a different polarity, the N charge pulses are thereby reduced by the N discharge pulses to obtain an analog voltage corresponding to 2NΔT from which a mass flow rate is calculated.

Another object of the present invention is to provide a mass flowmeter converter for use in a Coriolis flowmeter which is of double straight tube type comprising an inner flow tube allowing measurable fluid to flow therethrough, a counter balance being a substantially rigid straight tube concentrically enclosing the inner flow tube and supported at both ends on the inner flow tube and a driving means for oscillating the double straight tubes supported at both ends, whereby a mass flow proportional to a phase difference at opposite positions near to the supporting points is measured, a density corresponding to a natural frequency is determined and the obtained mass flow and the calculated density are corrected for temperature of the measuring flow tube and temperature of the counterbalance, thereby enabling the mass flowmeter to measure mass flowrate at a high accuracy in a wide range of temperature.

DESCRIPTION OF THE PREFERRED EMBODIMENTS

In a Coriolis flowmeter which comprises a flow tube secured at both ends on supports with a driving means disposed at the center thereof and detecting coils arranged symmetrically on opposite sides of the driving means on the measuring flow tube. A mass flowmeter converter used therein has a circuit that, when a fluid flowing tube is oscillated at a constant frequency with a specified amplitude, e.g., a natural frequency by the driving means, receives detecting signals from the detecting coils, detects a phase difference signal proportional to a Coriolis force and outputs a mass flow detecting signal.

Figure 1:
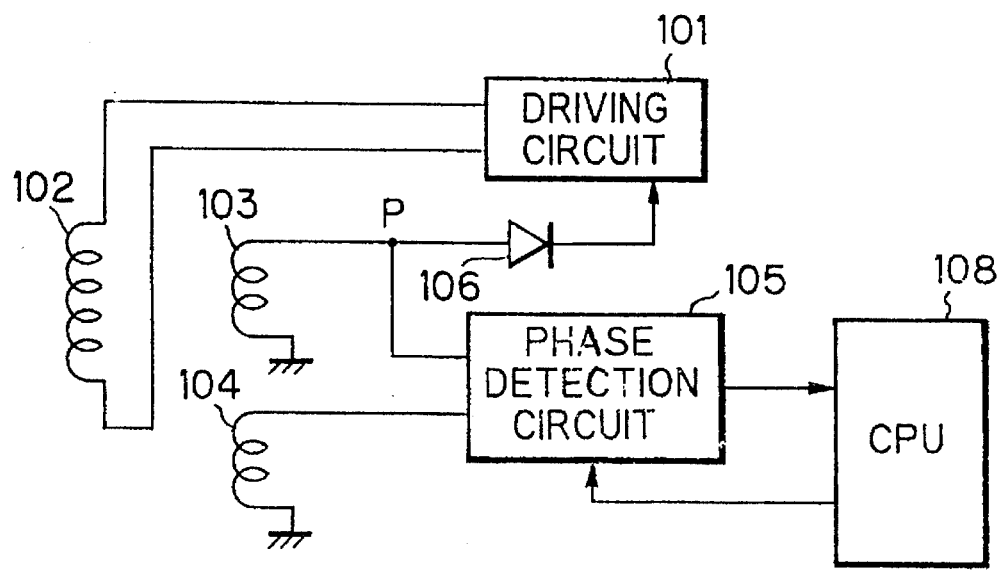
FIG. 1 is a block diagram for explaining construction of a conventional mass flowmeter.

FIG. 1 is a block diagram for explaining a construction of a conventional mass flowmeter converter wherein a driving portion is disposed at a middle portion of the flow tube (not shown) wherein measurable fluid flows. The driving portion consists of, e.g., a driving coil 102 and a core (not shown) receiving a magnetic force from the driving coil 102. Detecting coils 103 and 104 are each composed of a detecting coil and an electromagnet (not shown) symmetrically arranged on a flow tube, disposed at symmetrical positions on the flow tube, between the driving portion and the supporting walls of an outer housing.

Figure 2:
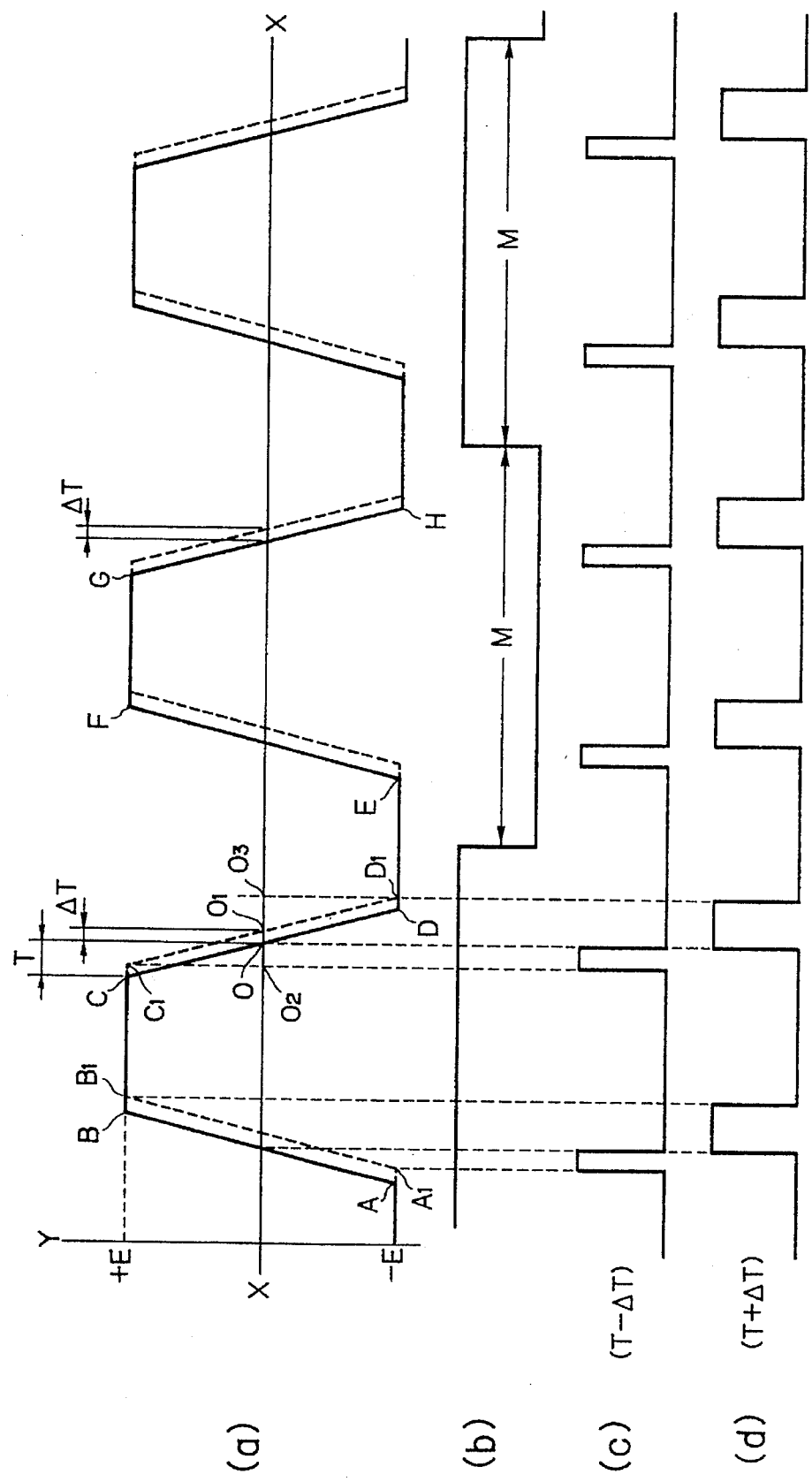
FIG. 2 is a view for explaining an example of measuring a time difference by a Coriolis flowmeter.

The driving coil 102 is connected to an output end of a drive circuit 101 having an input end connected to a DC signal derived from a sine-wave signal detected by the detecting coil 103 and rectified by a full-wave rectifier circuit. A positive feedback circuit formed by the detecting coil 103, the full-wave rectifier circuit 106, the driving circuit 101 and the driving coil 102 constitute a sine-wave oscillator circuit for generating a natural frequency of the flow tube 102. The detecting coil outputs a detection signal at a point P and transfers it to the full-wave rectifier circuit 106 which in turn converts the received detection signal into a DC voltage. The driving circuit 101 compares the DC voltage value with a reference voltage value and controls the frequency to obtain a constant sine-wave signal at the point P. In this case, the sine-wave signals outputted from the detecting coils 103 and 104 are velocity signals which are therefore entered into a phase detection circuit 105 wherein they are integrated and converted into position signals. Consequently, the detected voltage of the detecting coil 104 becomes a constant amplitude sine-wave signal having a phase difference relative to the sine-wave signal of the detecting coil 103, the phase difference being proportional to a Coriolis force. The phase difference is converted into a time difference, detected and transferred by the phase detecting circuit 105 to a CPU (central processing unit) 108 which in turn converts the time difference signal into a mass flowrate signal and outputs it. Referring to FIG. 2, the operation of the phase detecting circuit 105 is illustrated by an example of measuring a time difference in a Coriolis flowmeter. In FIG. 2-(a), there is shown a graph of trapezoidal-wave signals obtained by amplifying and shaping a constant-amplitude sine-wave signals, having a constant phase difference, detected at detecting positions on the flow tube. The horizontal axis is time and the vertical axis is voltage. A trapezoid ABCD . . . and a trapezoid $A_1B_1C_1D_1$ . . . are displacement signals of the flow tube, which are represented by voltages being different in phase and having the same absolute peaks in positive and negative directions (±E) in relation to a time base X-X. These displacement signals are the same continuous trapezoidal waves on the time base. A reference time for specifying a phase difference, for example, is a time T between a peak value C(+E) or D (−E) of an oblique side CD of the trapezoidal wave ABCD and a point O at which said side intersects the time base. In the case of the displacement signals of trapezoids ABCD and $A_1B_1C_1D_1$, which are different in phase from each other, phase-difference signals of oblique sides CD and $C_1D_1$ are detected.

An area $CC_1DD_1$ is a parallelogram and a time difference $\Delta T$ between parallel sides CD and $C_1D_1$ is the phase difference signal. Sides $CC_1$ and $DD_1$ have a length equal to a length of a time base segment $OO_1$. When points projected from points $C_1$ and $D_1$ onto the time base are expressed by $O_2$ and $O_3$ respectively, a side $O_2O$ represents a time $(T-\Delta T)$ and a side $OO_3$ represents a time $(T+\Delta T)$.

The time $(T-\Delta T)$ is expressed by a pulse of FIG. 2-(c) and the time $(T+\Delta T)$ is expressed by a pulse of FIG. 2-(d). The CPU 108 determines the time difference $\Delta T$. For a duration 2M being twice the pulse time width M corresponding to one period of a trapezoidal wave shown in FIG. 2-(b), an addend of each pulse width is subtracted to get an average value, for example:

$$\{4(T+\Delta T)-4(T-\Delta T)\}/8=\Delta T \quad (1)$$

Figure 3:
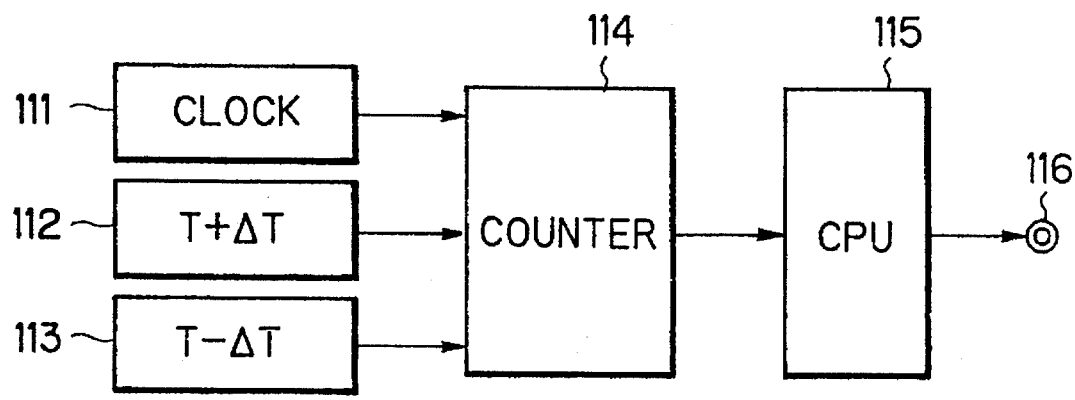
FIG. 3 is a block diagram of a conventional mass flowmeter converter for determining a time difference ΔT.

FIG. 3 is a block diagram of a conventional mass flowmeter converter for determining a time difference $\Delta T$, wherein a counter 114 measures pulse duration values of pulses $(T+\Delta T)$ and $(T-\Delta T)$ as numbers of counts of clock pulses generated from a clock pulse generator 111 and the CPU 115 calculates therefrom a digital value proportional to a mass flow and outputs a result at a terminal 116.

In the conventional mass flowmeter converter of FIG. 3, a time proportional to a phase difference of the measuring tube is measured as a digital value of clock pulse counts. To ensure a high accuracy of mass flow measurement, it is necessary to measure a time difference with a sufficient resolution, i.e., to get enough clock pulse counts proportional to a time difference for all range of flow measurements. In a Coriolis flowmeter having an axially symmetrical curved flow tube, wherein a Coriolis force is produced about a symmetrical axis when the curved measuring tube is driven by an oscillation in a direction perpendicular to the symmetry axis, it is possible to measure a time difference at a sufficiently high sensitivity by increasing a moment about a symmetry axis and, therefore, to determine a time difference by counting clock pulses. In a straight tube type Coriolis flowmeter having a measuring tube of high flexural rigidity and, therefore, a large natural frequency, a time difference signal produced by the action of a Coriolis force is very small and therefore it shall be measured by using a clock pulse oscillator that is capable of generating a high oscillation frequency of, e.g., 100 MHz. Clock pulse oscillators which are available do not have sufficient reliability and stability. In practice, it is rather difficult to get a high accuracy clock oscillator at an inexpensive cost.

Figure 4:
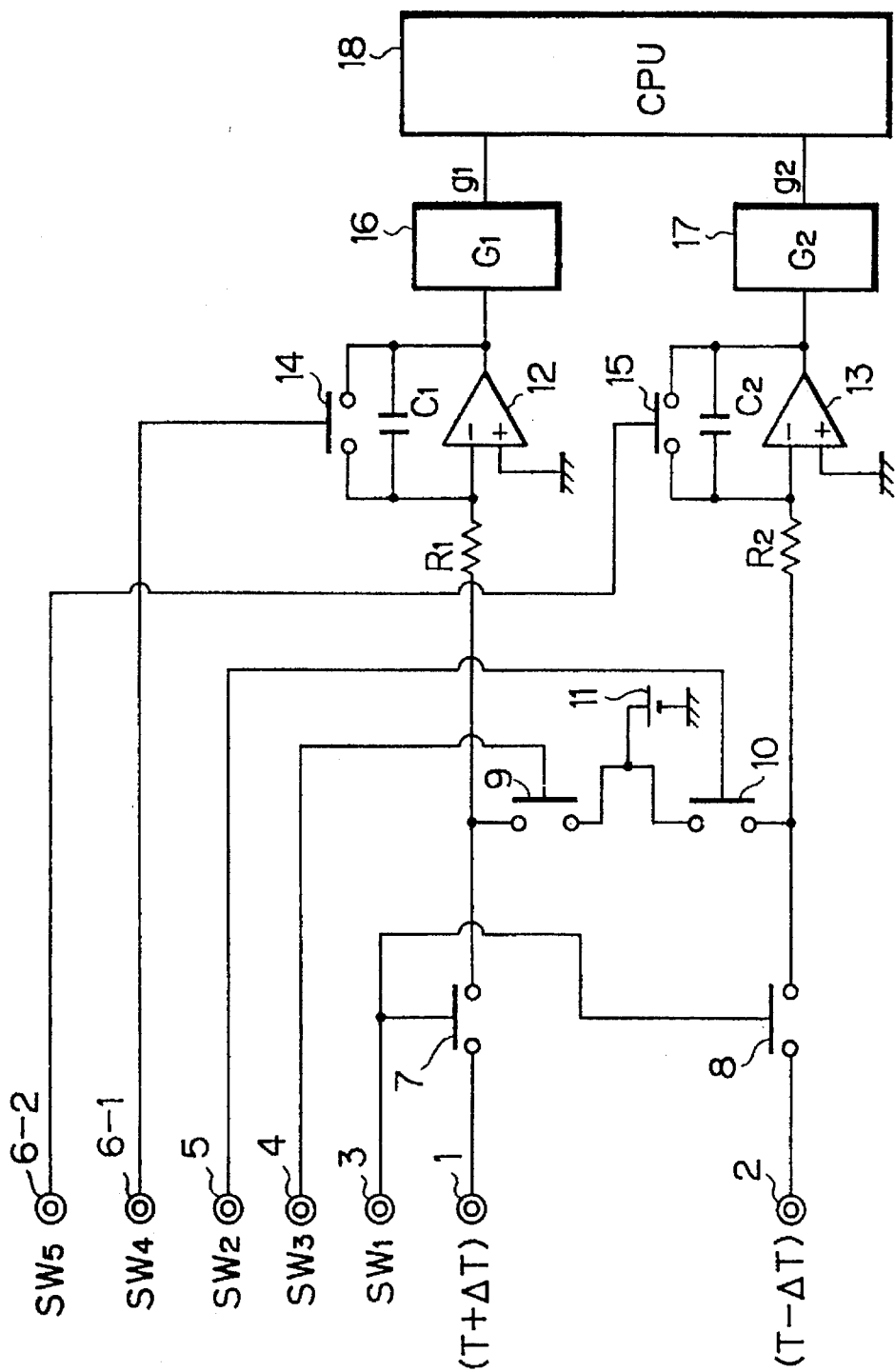
FIG. 4 is a circuit diagram for explaining an embodiment of a mass flowmeter converter according to the present invention.

FIG. 4 is a circuit block diagram of a mass flowmeter converter (embodiment 1) according to the present invention. In the circuit of the mass flowmeter converter of FIG. 4, a negative leading pulse $(T+\Delta T)$ which has a pulse width of a time $(T+\Delta T)$ and a constant voltage value $(-E)$ (referred hereinafter to as $(T+\Delta T)$ pulse) enters into an input terminal 1 which is connected by a contact 7, turned ON and OFF by a switch $SW_1$, a charging/discharging integrator circuit composed of an input resistance $R_1$, a feedback capacitor $C_1$ and an operational amplifier 12. A negative lagging pulse $(T-\Delta T)$, having a pulse width of a time $(T-\Delta T)$ and a constant voltage value $(-E)$ (referred hereinafter to as $(T-\Delta T)$ pulse) synchronously with the $(T+\Delta T)$ pulse, enters an input terminal 2 which is connected by a contact 8, turned ON and OFF by the switch $SW_1$, to a charge-discharge integrator circuit composed of an input resistance $R_2$, a feedback capacitor $C_2$ and an operational amplifier 13.

Feedback capacitors $C_1$ and $C_2$ of the operational amplifiers 12 and 13 are provided with contacts 14 and 15 connected in parallel respectively thereto and drivable by switches $SW_4$ and $SW_5$ respectively. The switches $SW_4$ and $SW_5$ turn ON just before charging operation to discharge the capacitors $C_1$ and $C_2$. The operational amplifier circuits 12 and 13 are provided with zero-crossing detector circuits 16 and 17 respectively, by which zero-crossing signals are detected and transferred into the CPU 18. The resistance values and capacitance values are selected to be equal to each other, i.e., $R_1=R_2$ and $C_1=C_2$. On the other hand, a contact 9, drivable by a switch $SW_3$, is connected in series between the contact 7 and the resistance $R_1$ and a contact 10, drivable by a switch $SW_2$, is connected in series between the contact 8 and the resistance $R_2$. A reference voltage source 11 for generating a positive reference voltage Es is connected between the contacts 9 and 10.

The operation of the above-mentioned mass flowmeter converter will be described below with reference to FIG. 5.

Figure 5:
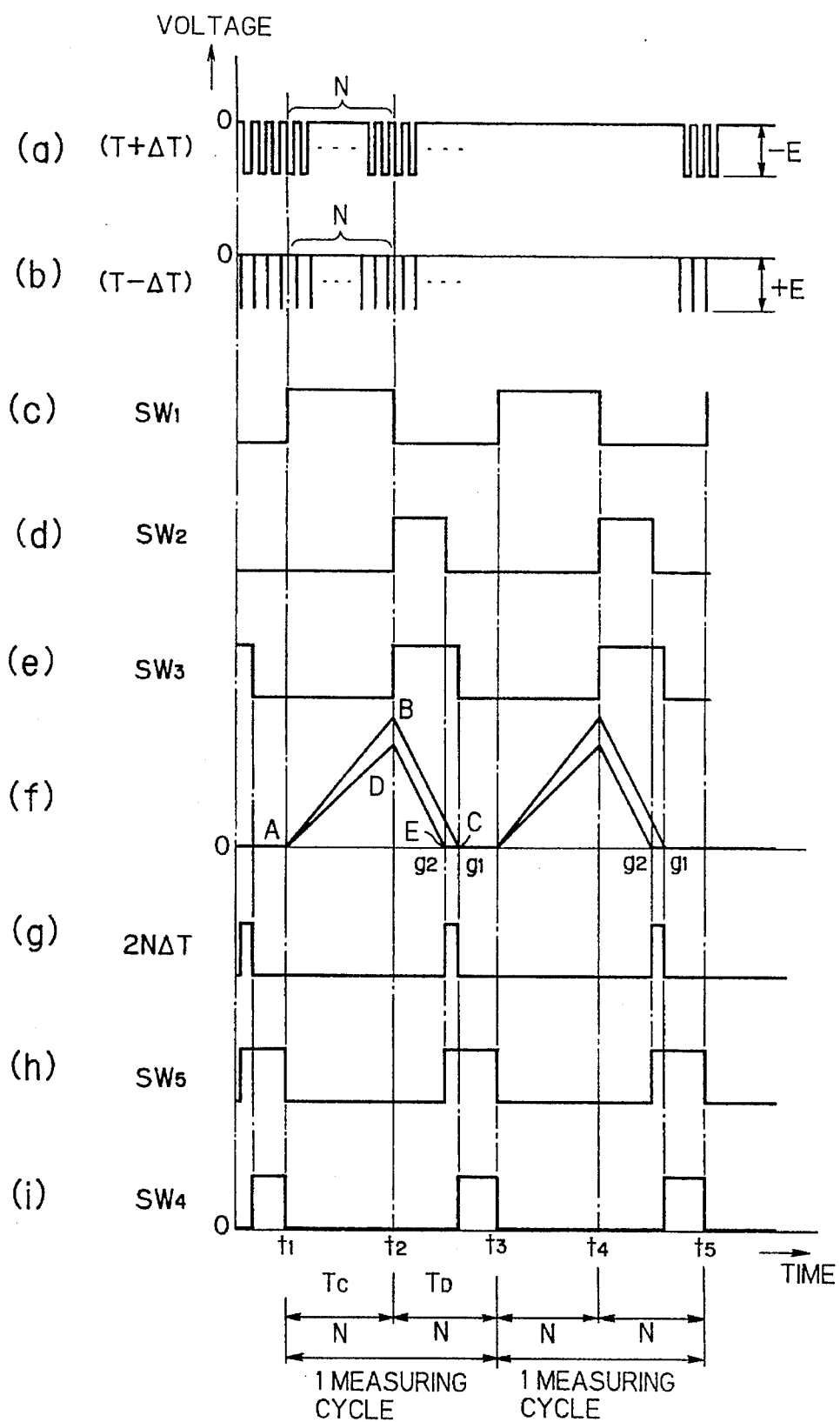
FIG. 5 is a time chart for explaining the mass flowmeter converter shown in FIG. 4.

FIG. 5 is a time chart for explaining the mass flowmeter converter shown in FIG. 4. For this instance, a measurement starts at a moment $t_1$ in the time chart. The switches $SW_4$ and $SW_5$ are first operated to turn ON the contacts 14 and 15 (FIG. 5-(i) and (h)), whereby the feedback capacitors $C_1$ and $C_2$ are discharged. After this, a high level signal of the switch $SW_1$ (FIG. 5-(c)) simultaneously closes the contacts 7 and 8 for a period from $t_1$ to $t_2$ in which N number of pulses $(T+\Delta T)$ (FIG. 5-(a)) enter the resistance $R_1$ and, at the same time, N number of pulses $(T-\Delta T)$ (FIG. 5-(b)) enter the resistance $R_2$. For this period, the switches $SW_2$ and $SW_3$ have a low level signal (FIG. 5-(d) and (e)) to keep OFF the contacts 10 and 9.

Consequently, The $R_1$-$C_1$ integrator receives an input of N pulses $(T+\Delta T)$ and has an output voltage that increases along the line AB (FIG. 5-(f)) in proportion to the number of input pulses input. At the same time, the $R_2$-$C_2$ integrator receives an input of N pulses $(T-\Delta T)$ and has an output voltage that increases along the line AD (FIG. 5-(f)) in proportion to the number of input pulses input. The pulse $(T+\Delta T)$ is apparently larger in width than the pulse $(T-\Delta T)$ and, therefore, a voltage at point B is larger than a voltage at point D. Next, in the period of $t_2$ to $t_3$, a low-level signal of the switch $SW_1$ (FIG. 5-(c)) causes the contacts open, the OFF signal makes switches $SW_2$ and $SW_3$ generate high-level output signals (FIG. 5-(d), (e)) by which the contacts 10 and 9 are respectively closed to apply a positive reference voltage $E_3$ of the reference voltage source 11 to the $R_1$-$C_1$ integrator and the $R_2$-$C_2$ integrator. The charge accumulated for the period of $t_1$ to $t_2$ are discharged. As paired resistances $R_1$ and $R_2$ are the same $(R_1=R_2)$ and the paired capacitors are the same $(C_1=C_2)$, the $R_1$-$C_1$ integrator and the $R_2$-$C_2$ integrator are discharged according to the line BC and the line DE respectively (FIG. 5-(f)) and respective discharging lines meet at respective zero-crossing points (time positions E and D) on a zero voltage line. The time constants $R_1C_1$ and $R_2C_2$ are equal to each other $(R_1C_1=R_2C_2)$ and the discharging is conducted by the negative reference voltage Es of the reference voltage source 11, lines BC and DE are parallel to each other and lines BD and EC are proportional to each other. The line EC represents the time base. The zero-crossing point C is detected by the zero-crossing detector 16 as a zero-crossing time signal $g_1$ while the zero-crossing point E is detected by the zero-crossing detector 17 as a zero-crossing time signal $g_2$. The detector 16 outputs a pulse having a pulse width of $g_1$ and the detector 17 outputs a pulse having a pulse width of $g_2$ (FIG. 5-(g)). A period between the time signals $g_1$ and $g_2$ is a time-difference signal of 2N times the time difference $\Delta T$ which is expressed as follows:

$$N(T+\Delta T)-N(T-\Delta T)=2N\Delta T \qquad (2)$$

The zero-crossing time signals $g_2$ and $g_1$ are inputted into the CPU 18 by which they are converted into digital clock signals which is further processed to form a signal of 2N times the time difference $\Delta T$ proportional to the measured mass flow and then outputted.

The high level signal (FIG. 5-(d)) of the switch $SW_2$, by the action of which the contact 10 is closed at a time $t_2$, is switched by a zero-crossing signal $g_2$ of the discharging line DE (FIG. 5-(g)) to a low-level signal at a time $g_2$. At the same time, the zero-crossing signal $g_2$ causes the switch $SW_5$ to raise a high level signal (FIG. 5-(h)) and close the contact 15 to discharge the charge of the capacitor $C_2$ of the $(T-\Delta T)$ pulse side integrator. The high level signal of the switch $SW_5$ becomes a low level signal followed by a high level signal of the switch $SW_1$ defining a time $t_3$ at which a succeeding measuring cycle starts (FIG. 5-(h)). Similarly, the high level signal (FIG. 5-(e)) of the switch $SW_3$, by which the contact 9 is closed at a time $t_2$, is switched by a zero-crossing signal $g_1$ of the discharging line BC (FIG. 5-(g)) to a low-level signal. At the same time, the zero-crossing signal $g_1$, causes the switch $SW_4$ to raise a high level signal (FIG. 5-(i)) and close the contact 14 to discharge the charge of the capacitor $C_1$ of the $(T+\Delta T)$ pulse side integrator. The high level signal of the switch $SW_4$ becomes a low level signal (FIG. 5-(i)) followed by a high level signal of the switch $SW_1$ defining a time $t_3$ at which the succeeding following measuring cycle starts (FIG. 5-(c)).

As shown in FIG. 5-(i), the period from $t_1$ to $t_2$ is a charging period Tc for simultaneously charging with N pulses $(T+\Delta T)$ and N pulses $(T-\Delta T)$. The period between $t_2$ and $t_3$ is a preparation period $T_D$ in which the charges are simultaneously discharged, the zero-crossing time $g_1$ of the $(T+\Delta T)$ pulses and the zero-crossing time $g_2$ of the $(T-\Delta T)$ pulses are determined, the time difference of $2N\Delta T$ is measured, the integrating capacitors $C_1$ and $C_2$ are discharged for a period between $g_2$ and $t_3$ of preparation for a succeeding cycle. Accordingly, one measuring cycle is a period between $t_1$ and $t_3$ starting from charging with N pulses $(T+\Delta T)$ and N pulses $(T-\Delta T)$ and ending at discharging the integrating capacitors $C_1$ and $C_2$ for preparation for succeeding measuring cycle. The measuring cycle is then repeated.

In a mass flowmeter converter including an embodiment 1 shown in FIG. 4, time constants $R_1C_1=R_2C_2$ are selected, but resistance R and capacitance C may be influenced by temperature and may vary over a long operation period. Consequently, the time constant may change, bringing an error into the time difference measurement. Another embodiment 2 of the present invention relates to a detecting circuit for detecting a deviation of a time difference, which occurs due to a change of the time constants $R_1C_1$ and $R_2C_2$. This embodiment is intended to realize a correction of a measured mass flow for a detected deviation of the time difference.

Figure 6:
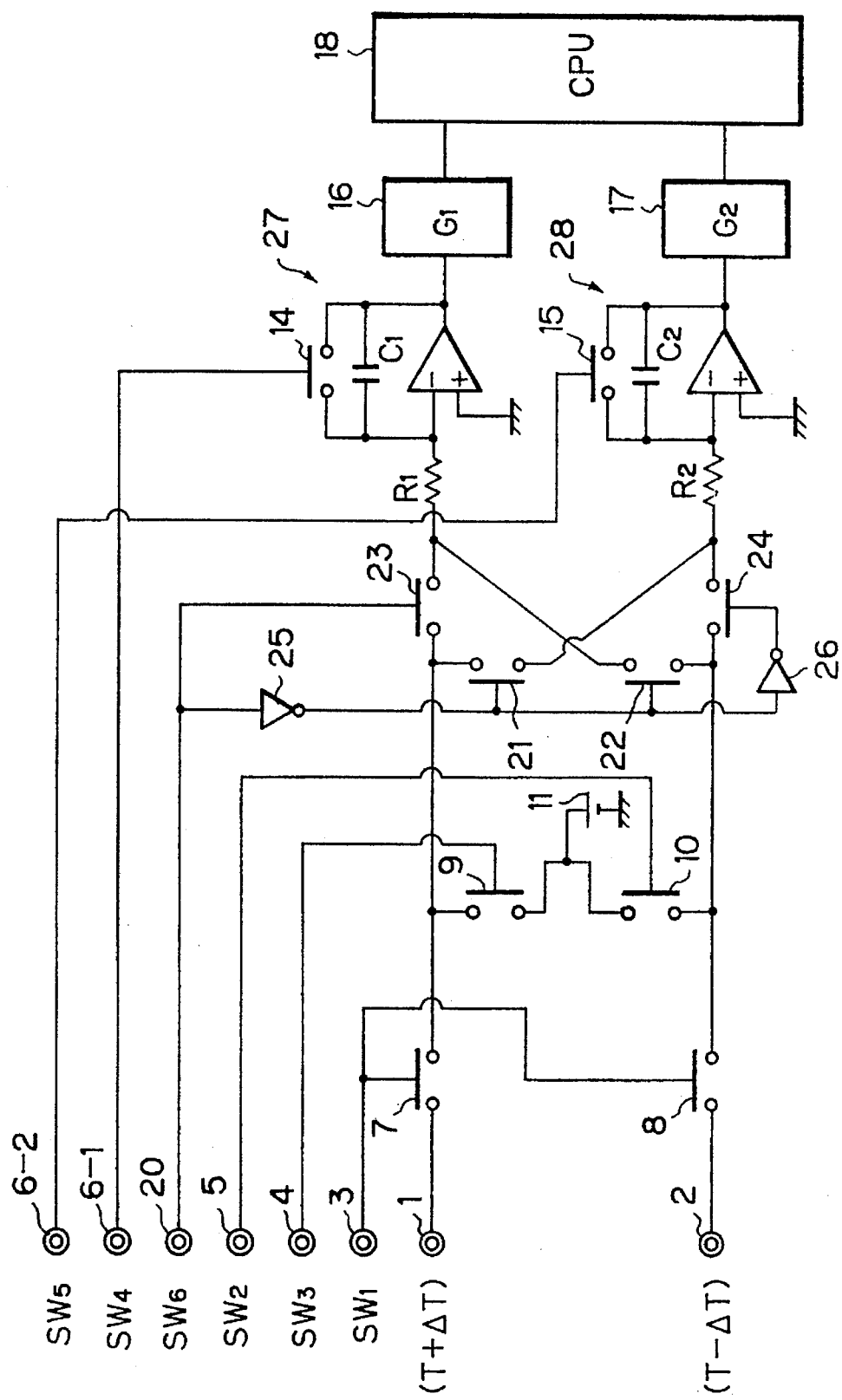
FIG. 6 is a circuit diagram for explaining another embodiment of a mass flowmeter converter according to the present invention.

FIG. 6 is a circuit diagram of another mass flowmeter converter embodying the present invention wherein components are added to the circuit of FIG. 4. In the circuit of FIG. 6, a contact 23 is connected between the contact 7 and the resistance $R_1$ of the line whereto $(T+\Delta T)$ pulses are applied. A contact 24 is connected between the contact 8 and the resistance $R_2$ of the line whereto $(T-\Delta T)$ pulses are applied. The contacts 23 and 24 are driven by a high-level signal of a switch SW6 connected with an input terminal 20. Furthermore, an inverter 25 is connected with the input terminal 20 and contacts 21 and 22 are closed by a low-level signal of the switch $SW_6$. An inverter 26 is connected with the inverter 25 and the contact 24 is substantially driven by a high-level signal of the switch $SW_6$.

The contact 21 is connected at one side between the contact 23 and 7 whereto $(T+\Delta T)$ pulses are supplied and connected at the other side between the contact 24 and the resistance $R_2$ in the line whereto $(T-\Delta T)$ pulses are applied. Similarly, the contacts 22 is connected at one side between the contact 24 and 8 whereto $(T-\Delta T)$ pulses are supplied and connected at the other side between the contact 23 and the resistance $R_1$ in the line whereto $(T+\Delta T)$ pulses are applied.

In the circuit shown in FIG. 6, the contacts 23 and 24 are closed by a high-level signal of the switch $SW_6$ for a period of measuring a time difference (mass flow). Similarly to the mass flowmeter converter circuit of FIG. 4, a time difference between $g_2$ and $g_1$ (FIG. 5-(g)) which is proportional to a mass flow is detected.

However, in testing whether the time constants $R_1C_1$ and $R_2C_2$ are changed by age deterioration, contacts 23 and 24 are opened by the low-level signal of the switch and, at the same time, the contacts 21 and 22 are closed, thereby N pulses $(T+\Delta T)$ applied to the input terminal 1 are transferred into the integrator of the time constant $R_2C_2$ and N pulses $(T-\Delta T)$ applied to the input terminal 2 are transferred into the integrator of the time constant $R_1C_1$. A time difference signal in mass flow measurement and a time difference signal in testing are compared with each other.

Figure 7A:
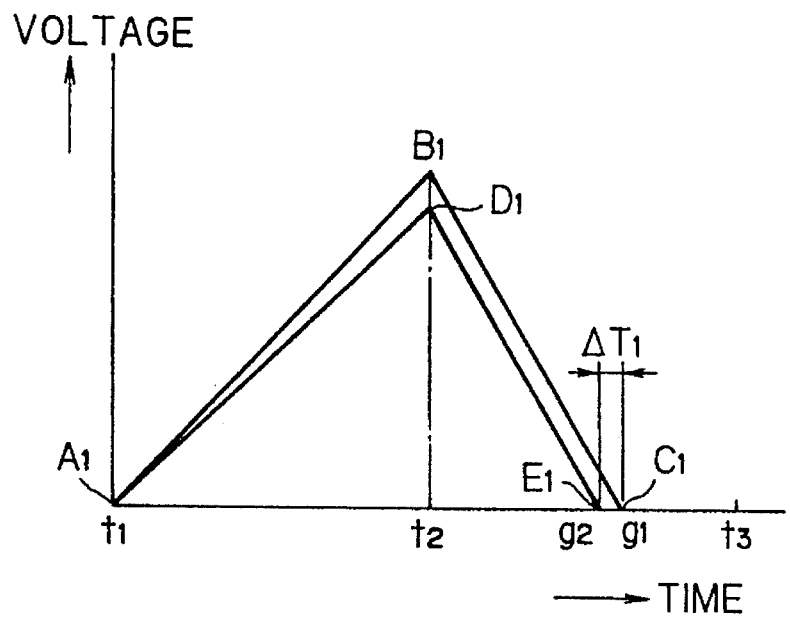
FIGS. 7A and 7B are output voltage characteristics for explaining the circuit operation of the mass flowmeter converter shown in FIG. 6.
Figure 7B:
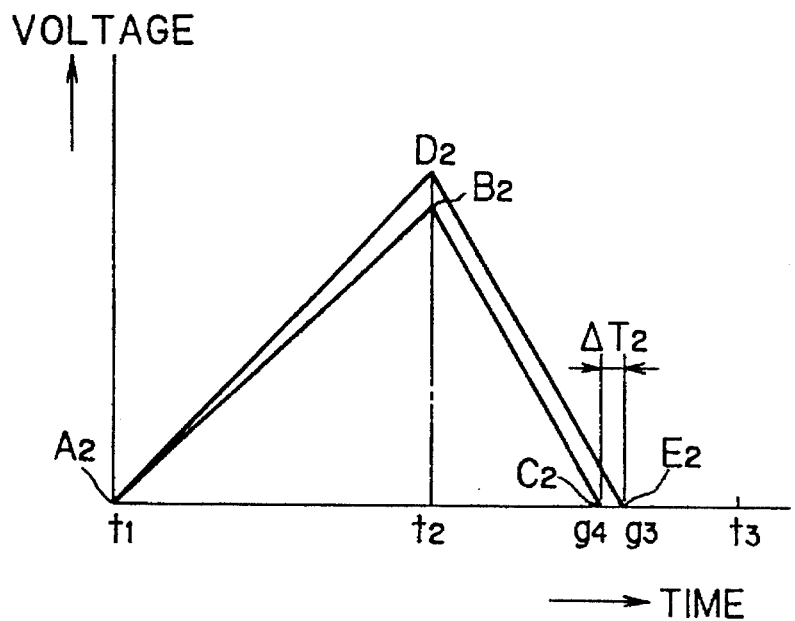

FIGS. 7A and 7B are output voltage characteristics demonstrating the operation of the mass flowmeter converter circuit shown in FIG. 6. FIG. 7A indicates the time-difference output-voltage characteristic of the converter circuit in usual mass flow measurement and FIG. 7B indicates the time-difference output-voltage characteristic of the converter circuit in testing.

In FIG. 7A showing a time-difference signal obtained in usual mass-flow measurement, N pulses $(T+\Delta T)$ applied to an input terminal 1 are inputted from the beginning of the period $t_1$ into the integrator having the time constant $R_1C_1$, which is charged till the time $t_2$ in proportion to the number N of input pulses according to the line $A_1B_1$. At the same time, N pulses $(T-\Delta T)$ applied to an input terminal 2 are inputted in the same period into the integrator having the time constant $R_2C_2$, which is charged till the time $t_2$ according to the line $A_1D_1$. Switches $SW_1$, $SW_2$ and $SW_3$ operate to cause the integrators to be discharged by means of a reference voltage source 11 according to respective lines $B_1C_1$, $D_1E_1$, and a measurement time difference is determined according to the following expression: $E_i \times C_1 = 2N \times \Delta T = \Delta T_1$ Referring to FIG. 7B, a time difference signal $\Delta T_2$ is obtained in testing wherein N pulses $(T+\Delta T)$ through an input terminal 1 are inputted into the integrator having a time constant $R_2C_2$ which outputs a charging voltage according a line $A_2$-$D_2$ and, at the same time, N pulses $(T-\Delta T)$ through an input terminal 2 are inputted into the integrator having a time constant R1C1 which outputs a charging voltage according to a line $A_2B_2$.

In the succeeding period between $t_2$ and $g_3$, the integrators are discharged by the reference voltage source 11 according to the respective lines $D_2E_2$ and $B_2C_2$ and a measurement time difference $E_3 \times C_2 = 2N \times \Delta T = \Delta T_2$ is determined.

In case the time constant $R_1C_1$ is equal to the time constant $R_2C_2$, it is judged that there is no aged deviation of both time constants $R_1C_1$ and $R_2C_2$ if the measured time differences $\Delta T_1 = \Delta T_2$. When the time constants $R_1C_1 - R_2C_2$ is equal to $\Delta T_8$, a measured time error $\Delta T8$ is detected as a doubled value expressed as follows:

$$|\Delta T_1 - \Delta T_2| = 2|\Delta T8| \tag{3}$$

The measured time difference includes a deviation, causing an error in measured flowrate value. The CPU 18 determines this measured time error $\Delta T_8$ and corrects the measured mass flowrate value for the calculated error value.

As mentioned above, the mass flowmeter converter shown in FIG. 6, which is an embodiment of the present invention, in addition to an effect proposed by the embodiment 1 shown in FIG. 4, can measure, at a specified interval, a possible error of measurements due to a change of essential time constants caused by age deterioration of elements and/or temperature influence and can correct the measured flowrate value for a detected error, assuring reliable and accurate mass-flow measurements at an increase sensitivity. Although $2N|\Delta T_8|$ is a very small value and may considerably vary depending on the surrounding conditions of the mass flowmeter converter, a much complicated technique must be used to univocally determine a correcting cycle and execute it at a specified interval. The present invention is directed to provide a simplified method for univocally determining the error correcting cycle.

To solve the above-mentioned problem, the following embodiment of the present invention is to provide a method for eliminating in time series a drift and age change of an integrating circuit without using special correcting means in such a way that, using a merit of measuring a time difference $\Delta T$ at a high sensitivity by charging and discharging N pulses (T+$\Delta T$) and N pulses (T−$\Delta T$), a measurement error $\Delta T_8$ of a time difference $\Delta T$, which appears as 2N times enlarged value, is corrected between a measuring cycle and next measuring cycle and such correction is repeated in time series. In the mass flowmeter shown in FIG. 6, a first integrating circuit 27 with an input of N pulses (T+$\Delta T$) and a second integrating circuit 28 with an input of N pulses (T−$\Delta T$) are charged at the same time with respective charging voltages and then discharged at the same time by a reference voltage, thereby zero-crossing signals are obtained. The zero-crossing signals include a time measurement error for each measuring cycle. In the next measuring cycle, N pulses (T+$\Delta T$) are inputted into the second integrating circuit 28 and N pulses (T−$\Delta T$) are inputted into the first integrating circuit 27. The time differences obtained by two successive measuring cycles are added to each other to obtain a time difference signal $2N(\Delta T)$ wherein no error is included. This method is described below.

N(T+$\Delta T$) and N(T−$\Delta T$) in the equation (1) are time signals containing a drift (including an age change) of the first integrating circuit 27 and the second integrating circuit 28 respectively.

$$N(T+\Delta T) = ta_2 + to_2 \tag{4}$$

$$N(T-\Delta T) = ta_1 + to_1 \tag{5}$$

where $ta_1$ and $ta_2$ are accurate times corresponding to a mass flow, and $to_1$ and $to_2$ are times corresponding to a drift.

Therefore, the equation (2) is converted to:

$$N\{(T+\Delta T)-(T-\Delta T)\} = (ta_2+to_2)-(ta_1+to_1) = (ta_2-ta_1)+(to_2to_1) \tag{6}$$

Supposing that $(to_2-to_1)=o$, the equation (6) can be simplified as follows:

$$\Delta T = (ta_2-ta_1)/2N \tag{6'}$$

To attain $(to_2-to_1)=o$, a first measuring cycle in the equation (5) applies N pulses (T+$\Delta T$) to the first integrating circuit 27 and N pulses (T−$\Delta T$) to the second integrating circuit 28 and determines $2N(\Delta T)$. Next measuring cycle applies N pulses (T+$\Delta T$) to the second integrating circuit 28 and N pulses (T−$\Delta T$) to the first integrating circuit 27 and determines $2N(\Delta T)$. Two time difference values obtained by the first measuring cycle and the second measuring cycles are combined as be in the equation (5):

$$\begin{aligned} N\{(T+\Delta T)-(T-\Delta T)\} &= (ta_2+to_1)-(ta_1+to_2) \\ &= (ta_2-ta_1)+(to_1+to_2) \end{aligned} \tag{7}$$

Accordingly, the equations (6) and (7) are added to each other as follows:

$$\begin{aligned} 4N\Delta T &= (ta_2-ta_1)+(to_2-to_1)+(ta_2-ta_1)+ \\ &\quad (to_1-to_2) = 2(ta_2-ta_1) \end{aligned} \tag{8}$$

$$\Delta T = (ta_2-ta_1)/2$$

Equation (8) is the same as the equation (6'). Accordingly, this method can determine a time difference $\Delta T$ accurately proportional to a mass flow, without the influence of a drift. N pulses (T+$\Delta T$) are measured by the first integrating circuit 27 and N pulses (T−$\Delta T$) are measured by the second integrating circuit 28 in the first measuring cycle and N pulses (T+$\Delta T$) are measured by the second integrating circuit 28 and N pulses (T−$\Delta T$) are measured by the first integrating circuit 27 in the second measuring cycle. Then, the successive measuring cycles are conducted, alternating the integrating circuits as above described. The drift values of the first and second integrating circuits 27 and 28 can be thus compensated by each other.

Figure 8:
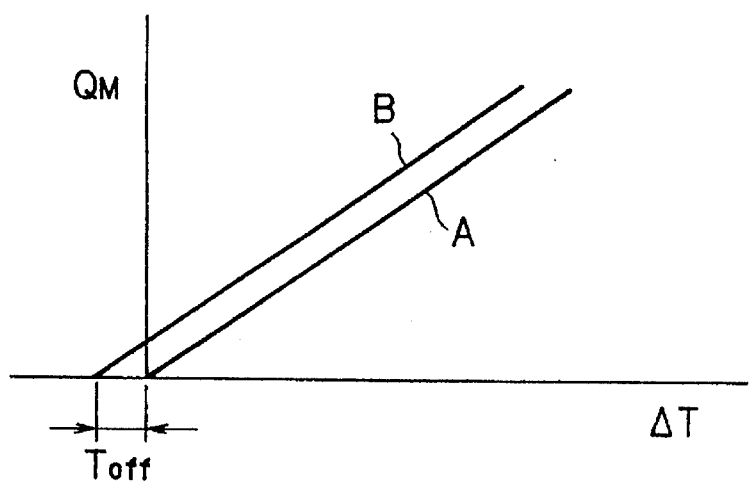
FIG. 8 shows a relationship between a time difference ΔT and a mass flow rate QM.

The pulses (T+$\Delta T$) and (T−$\Delta T$) inputted into the mass flowmeter converter shown in FIGS. 4 and 6 are voltage pulses having a constant crest value and the same positive and negative voltage values. N pulses (T+$\Delta T$) and N pulses (T−$\Delta T$) are inputted simultaneously into the respective integrating circuits and then discharged simultaneously by using a reference voltage source to measure a 2N-fold zero-cross time-difference value (2N$\Delta T$), eliminating a time error ($\Delta T_8$) caused in the respective integrating circuits. The obtained time-difference value 2N$\Delta T$, however, includes another error of time measurement. For instance, as shown in FIG. 8, a time difference $\Delta T$ must be equal to 0 at a zero flow when a flow measurement cycle starts. But, a value $\Delta T$ may not be equal 0 because the detecting coils 103 and 104 may have different detection gains to leave an offset time $T_{off}$. Therefore, it is needed to conduct the zero point adjustment of the flowmeter converter before starting the flow measurement. After zero point adjustment, however, zero drift may occur as any state variable changes with time elapsed, resulting in a measurement error.

Like a usual volumetric flowmeter, a Coriolis flowmeter must perform flow measurements of various kinds of fluid under various measuring conditions such as flow range, temperature, pressure and so on. For a Coriolis flowmeter whose flow tube oscillates at a resonant or natural frequency the oscillation frequency may vary, for example, depending upon density of a measurable fluid, diameter, length and geometrical figure of the flow tube, which may be selected for a specified measuring range of flow. In an ideal Coriolis flowmeter, if the density of a measurable fluid is constant and natural frequency of its flow tube is constant, a time difference ΔT to be measured is specified and a mass flow is proportional to the time difference ΔT. In practice, the time-difference ΔT is not proportional to the mass flow at a constant natural frequency, causing a drift. As to a phenomenon that a drift may occur in a time difference ΔT proportional to a Coriolis force by a change of a natural frequency of a flow tube, the applicant has examined a relationship between a drift value $Z_f$ of a time difference ΔT and a natural frequency f.

Figure 9:
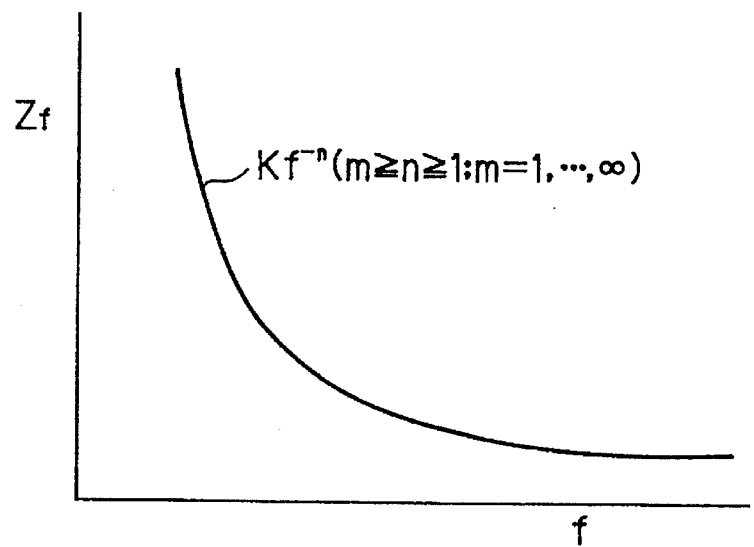
FIG. 9 depicts experimental results for explaining a relationship between a natural oscillation and a drift value for a time difference.

FIG. 9 shows the results of an experiment to examine the relationship between a flow tube natural frequency f and a drift value $Z_f$ for a time difference. The horizontal axis is labeled with the natural frequency f and the vertical axis is labeled with a drift value (time) $Z_f$. The drift value $Z_f$ gradually decreases as the natural frequency f changes from a lower frequency to a higher frequency. The applicant found the relationship having the following expression:

$$Z_f^{\infty} K \times f^{-n} \tag{9}$$

$(m \geq n \geq 1; m=1, \ldots, \infty)$

The reason why this relationship occurs is as follows:

A sine-wave signal of the detecting coil is controlled to have a constant peak value even when a magnitude of an input signal to the driving circuit 101 shown in FIG. 1 changes, and, furthermore, a trapezoidal signal ABCD shown in FIG. 2, which is obtained by amplifying and shaping a constant amplitude sine-wave detection signal of the phase detecting circuit 105, has a constant height of voltage (±E) on the time base X-X and slope angles of the oblique sides AB and CD of the trapezoid changes as the natural frequency, but the oblique sides AB and CD are not accurately but approximately straight lines. Consequently, a constant K in an expression of FIG. 9 is constant.

$$K \times f^{-n} \tag{10}$$

$(m \geq n \geq 1; m=1, \ldots, \infty)$

This relationship makes it possible to make a correction for a drift value.

Figure 10:
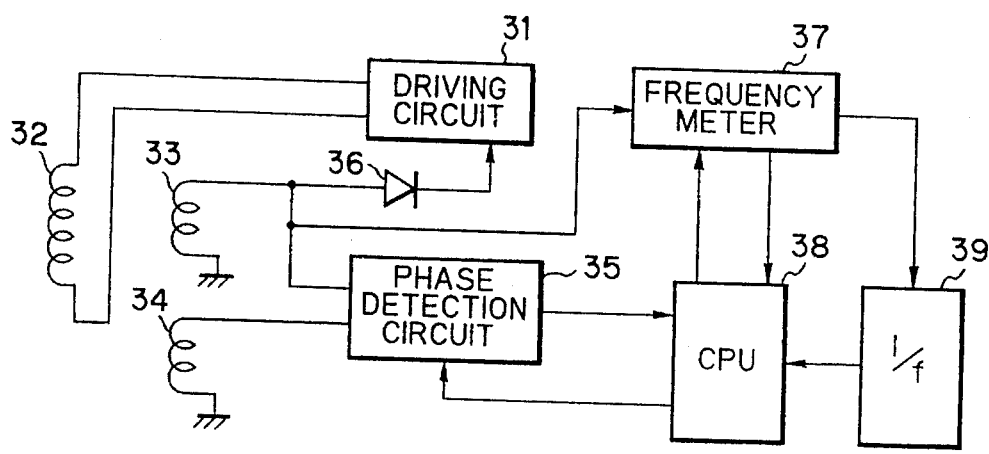
FIG. 10 is a circuit diagram for explaining another embodiment of a mass flowmeter converter according to the present invention.

FIG. 10 is a view for explaining another embodiment of a mass flowmeter converter according to the present invention. A driving circuit 31, a driving coil 32, detecting coils 33 and 34 and a phase detecting circuit are similar in function to those shown in FIG. 1. A frequency meter 37 is means for measuring a natural frequency of a flow tube, which in practice measures a frequency of a detection signal from the detecting coil 33 which generates a frequency the same as a natural frequency. The detection signal of the detecting coil 33 is shaped and a zero-crossing time of an obtained rectangular wave corresponding to the half-frequency or a frequency is detected as a clock counts of CPU 38, then a natural frequency f is determined. The following expression is calculated by a reciprocal calculating portion 39.

$$f^{-n} \tag{11}$$

$(m \geq n \geq 1; m=1, \ldots, \infty)$

The value n (for example, 1) is stored in the CPU 38. This is a drift value $Z_f$ shown in the expression (9). Consequently, the time difference $T_x$ after correction is expressed as follows:

$$T_x = T_a - Z_f \tag{12}$$

where, $T_a$ is phase detection data corresponding to a detection time difference ΔT.

An offset data shown in FIG. 9 for zero-point adjustment is taken as $T_{off}$ which is added to the equation (12) for further improvement of measuring accuracy. The value $T_{off}$ is stored in the CPU 38 to obtain the following equation:

$$T_x = T_a - T_{off} - Z_f \tag{13}$$

The equation (9) can be generalized as follows: 1

$$\frac{1}{Z_a \times f + Z_b} + Z_c \tag{14}$$

where, $Z_a$, $Z_b$ and $Z_c$ are coefficients of $Z_f$. The drift value $Z_f$ can be corrected according to the equation (14). Needless to say, a reciprocal expression of the equation (14) may be applied. As mentioned above, an accurate mass flow can be determined from a time difference value corrected for a drift value according to the equation (13).

For all above-mentioned cases, pulses (T+ΔT) and (T−ΔT) to be inputted into the mass flowmeter are of the same voltage having the same crest values. The following description relates to a mass flowmeter converter whose input pulses (T+ΔT) and (T−ΔT) have different signs and different crest values.

Figure 11:
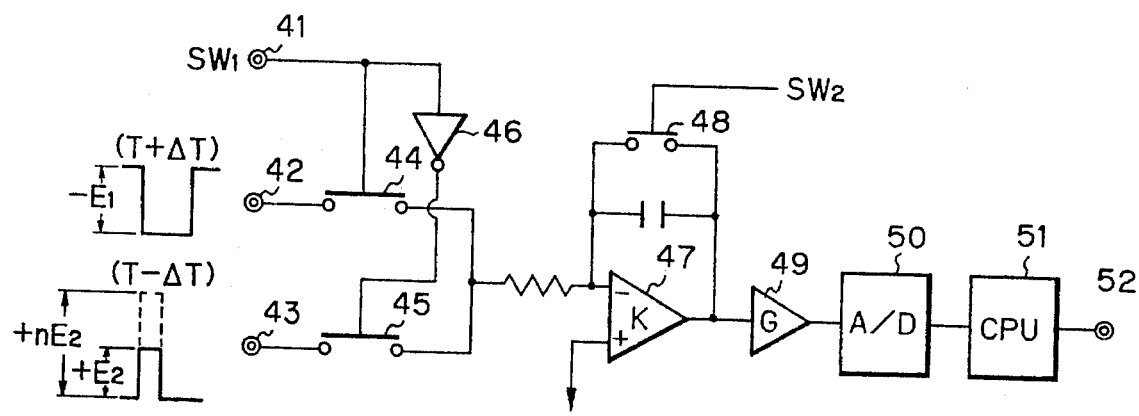
FIG. 11 is a circuit diagram for explaining another embodiment of a mass flowmeter converter according to the present invention.

FIG. 11 is a block circuit diagram of another mass flowmeter converter embodying the present invention. For example, pulses (T+ΔT) having a crest value (−E1) are applied to a terminal 42 and pulses (T−ΔT) having a crest value (+E2) are applied to a terminal 43. The terminal 42 has a serially connected contact 44 and the terminal 43 has a serially connected contact 45. The pulses are inputted through the terminals 42 and 43 into an integrator which is composed of an integrating constant RC (an input resistance R and capacitor C) and an operational amplifier circuit 47. A specified positive reference voltage (not shown) is applied to the positive input terminal of the operational amplifier circuit 47. A contact 48 to be closed and opened by a switch $SW_2$ is connected in parallel to the feedback capacitor C.

The operational amplifier circuit 47 is connected with a voltage holding circuit 49 whereto an A/D-converter circuit 50 and a CPU 51 are connected.

Figure 12:
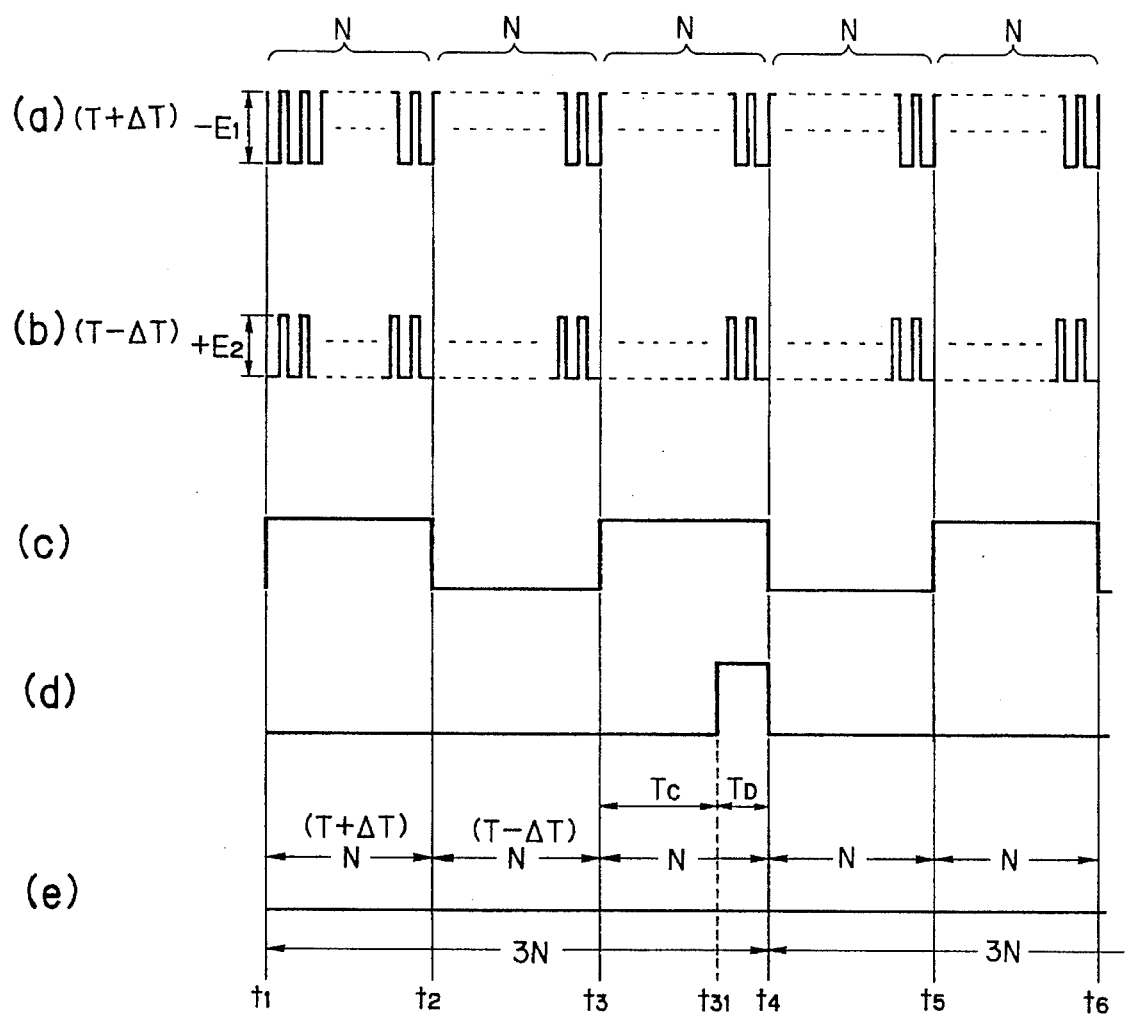
FIG. 12 is a time chart of a pulse train for explaining the operation of the mass flowmeter converter shown in FIG. 11.

FIG. 12 illustrates a pulse-train time chart for explaining the operation of the mass-flowmeter converter shown in FIG. 11. FIG. 12-(a) shows a train of pulses (T+ΔT) having a crest value (−$E_1$), FIG. 12-(b) shows a train of pulses (T−ΔT) having a crest value (+$E_2$), FIG. 12-(c) shows voltage signals of the gate circuit driving switch $SW_1$, FIG. 12-(d) shows a pulse signal of the switch $SW_2$ and FIG. 12-(e) is a chart showing a measuring cycle.

When the gate driving voltage applied to the switch $SW_1$ is a high-level signal, the contact 44 is closed (ON) and the contact 45 is opened (OFF). On the contrary, when the gate driving voltage applied to the switch $SW_1$ is a low-level signal, the contact 44 is opened (OFF) and the contact 45 is closed (ON) through an inverter 46. Pulse width of the gate driving voltage of the switch $SW_1$ defines an ON-duration of the gate circuit in which pulses (T+ΔT) or (T−ΔT) are sampled in. The pulse width of the gate driving voltage is set to the time necessary for inputting pulses ((T+ΔT) and (T−ΔT) each by N pulses (N>1).

For the high-level period between $t_1$ and $t_2$ of the gate driving voltage signal, the contact 45 is OFF and the contact 44 is ON, allowing voltage pulses (T+ΔT) (−E) through the terminal 42 enter into an integrator consisting of the resistance R, the feedback capacitor C and the operational amplifier circuit 47. The capacitor C is completely discharged through the contact 48 driven by the switch $SW_2$ (FIG. 12-(d)) till the time $t_1$ of inputting the pulses (T+ΔT). Switching operations of the switch $SW_2$ are programmed by the CPU 51. N pulses (T+ΔT) have the same area ((T+ΔT)× (−E)) at a constant flow velocity. Accordingly, when the pulses (T+ΔT) (−E$_1$) are inputted, inverted pulses (T+ΔT) are outputted by the integrator and integrated. Namely, the integrator circuit becomes a charging circuit and its output voltage proportionally increases as the number of the input pulses (T+ΔT) increases.

Figure 13:
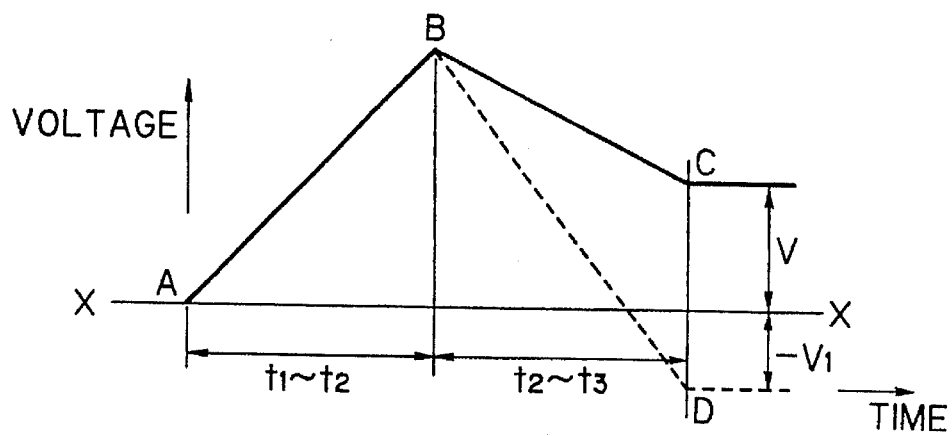
FIG. 13 shows a voltage-time characteristic of charge-discharge voltage during a time interval from $t_1$ to $t_2$ and a time interval from $t_2$ to $t_3$ of the time chart shown in FIG. 12.

FIG. 13 is a graph showing a voltage-to-time characteristic of voltage to be charged and discharged for the periods between t$_1$ and t$_2$ and between t$_2$ and t$_3$, respectively, of the time chart shown in FIG. 12. During the charging period between t$_1$ and t$_2$, the integrator circuit is charged with a voltage which, as the number of input pulses (T+ΔT) increases, increases proportionately according to a straight line AB from point A to point B.

During the period between t$_2$ and t$_3$, the gate driving voltage of the switch SW$_1$ is held as a low-level signal making the contact 44 open but the contact 45 is held closed (ON) by a high-level signal from the inverter 46, thereby only pulses (T−ΔT) of input voltage (+E$_2$) enter into the integrator through the terminal 43. At this time, the integrator becomes a discharging circuit which is discharged by an inverted output of pulses (T−ΔT). The voltage by which the integrator is charged to the point B by pulses (T+ΔT) is reduced with time by the voltage corresponding to the number (N) of pulses (T−ΔT). Since the pulse (T+ΔT) is wider than the pulse (T−ΔT), the integrator (charging/discharging circuit) outputs a voltage V corresponding to the value determined according to the equation (2): N(T+ΔT)−N(T−ΔT)=2NΔT.

As shown in FIG. 12-(e), the period between t$_1$ and t$_3$ is a measuring period for outputting an analog output voltage V proportional to 2NΔT. The output voltage V is held by the voltage holding circuit 49 and converted into a digital value by the A/D-converter circuit 50. The CPU 51 reads the converted digital signal and determines the mass flowrate. A time is further needed for calculating the mass flowrate and a time is needed for preparing the subsequent measuring cycle by discharging a charge on the integrating capacitor C, which corresponds to the voltage V.

The time duration t$_3$−t$_4$ for outputting the voltage V (time t$_3$) and inputting a subsequent train of N pulses (t$_3$−t$_4$) is a period including the above-mentioned operating period T$_c$ (t$_1$−t$_{31}$) of the CPU 51 and the preparing period TD (t$_{31}$−t$_4$) for discharging the feedback capacitor C for preparation for next measuring cycle. This period is given the same time duration as that allocated to the period between t$_1$ and t$_2$ and the period between t$_2$ and t$_3$. Consequently, one measuring cycle is a period corresponding to the period between t$_1$ and t$_4$ for inputting the number (3N) of pulses.

The discharging time of the feedback capacitor C is given by a high-level signal of a voltage pulse from the switch SW$_2$. The high-level signal is raised by an operation end signal of the CPU 51 and is trailed by a signal generated by the switch SW$_1$ at the time t$_4$ when one measuring cycle is finished. A next measuring cycle is a period corresponding to a time for inputting 3N input pulses from the high-level signal fall time t$_4$. A subsequent measuring cycle starting from the time t$_4$ and corresponding the to a period for inputting 3N pulses and the preceding measuring cycle of the above-mentioned time period between t$_1$ and t$_4$ are different from each other in that the polarity of the gate driving voltage of the switch SW$_1$, i.e., a high-level signal is given for the measuring cycle period between t$_1$ and t$_4$ whilst a low-level signal is given for the subsequent measuring cycle period between t$_4$ and t$_7$ (not shown).

For this reason, in the subsequent measuring cycle, the first duration t$_4$−t$_5$ is to charge the integrating circuit with a negative voltage by an inverted output of N number of pulses (T−ΔT) having a constant crest value (+E$_2$) and the succeeding duration t$_5$−t$_6$ is to discharge the integrating circuit with positive voltage by an inverted output of N number of pulses (T+ΔT) having a constant crest value (−E$_1$). Consequently, the output voltage V is the same as that of the preceding measuring cycle from t$_1$ to t$_4$.

A voltage V=2NΔT is outputted by the integrator at the time t$_3$ of the preceding measuring cycle and the time t$_6$ of the succeeding measuring cycle and held in the voltage holding circuit. The held analog voltage is inputted into the A/D-converter circuit 10 whereby it is converted into a digital signal proportional to the analog voltage and outputted. The digital signal is then transferred into the CPU 51 which carries out a mathematical operation on the received digital data to obtain a mass flowrate proportional to the voltage V. The calculation result is outputted from the CPU 51 through the terminal 52. As described above, N pulses (T+ΔT) and N pulses (T−ΔT) are processed through charging and discharging operations realized by switching the contacts 4 and 5 with the gate driving voltage of the switch SW$_1$. A mass flowrate signal with a twice-increased (2N) sensitivity is thus outputted.

The output voltage V is an analog voltage which is usually outputted through an operational amplifier (OP-Amp). However, if the output voltage V has a small value close to zero, the operational amplifier may enter into an unstable working range in which measurement may be influenced by a zero-point drift. If a crest value (−E$_1$) of a pulse (T+ΔT) is, for example, equal to a crest value (+E$_2$) of a pulse (T−ΔT), i.e., |E$_1$|=|E$_2$|, the output voltage of the operational amplifier is zero with no flow of a measurable fluid (i.e., at ΔT=0). The amplifier may unstably work with an influence of a zero-point drift. A stable range of the output voltage V to be measured with no zero-level voltage is obtained by selecting a relation (|E$_1$|>|E$_2$|).

To obtain a negative voltage range of the output voltage V, in which no zero-voltage is included, it is necessary to select a value n (n>1) in such a way that multiplying the crest value of a pulse (T−ΔT) by the value "n" may make the output voltage be negative when no flow exists. In FIG. 13, a pulse (T−ΔT) of thus selected voltage (+nE$_2$) is illustrated by a dotted line, which can make a measured voltage be negative in the negative voltage range (−V$_1$) indicated by a dotted line (FIG. 13).

As mentioned above, the mass flowmeter converter shown in FIG. 11 can determine a time difference signal 2NΔT which represents a multiplied by a factor 2N residue of subtraction of N number of pulses (T−ΔT) from N number of pulses (T+ΔT). This feature enables the mass flowmeter to measure a mass flow at a high sensitivity and a high accuracy by only selecting a suitable N value without using a special clock oscillator.

The following description relates to error correcting means for correcting an error of a flow measurement, which may occur with a change of temperature of a measurable fluid in a flow tube of a Coriolis flowmeter of, particularly, a straight flow-tubing type, which is characterized by relatively low detection sensitivity. As described before, a Coriolis force is detected as a phase difference signal which is a difference of measurements at a symmetrically opposite two points on a flow tube supported at both ends and being driven with an oscillation. This phase difference signal is very small. To accurately detect the Coriolis force it is necessary to design a flow tube to generate a lager phase difference. For this reason, many flowmeters use a variety of curved flow tubes which, however, have an increased size and may easily allow foreign matters (e.g., slurry) to accumulate on the inner bottom wall of each bent portions of the tube.

Consequently, straight tubes are also applied in many flowmeters with a view point of preferring the simplicity in use rather than detection sensitivity. However, the straight tubes which have a relatively low sensitivity of detecting a Coriolis force can be easily influenced by a disturbance. In a straight tube type Coriolis flowmeter, a straight flow tube is coaxially supported in an outer tube connected by a flange with a piping and driving means for oscillating the flow tube (hereinafter referred to as inner tube) and detecting means for detecting a phase difference signal are disposed between the inner and outer tubes. The straight-tube type Coriolis flowmeter must measure a variety of fluids at different temperatures and different densities in its inner tube. In the flow measurement, the inner tube expands or contracts depending on temperature of the fluid flowing therein and the outer tube may be less influenced by the fluid temperature and maintained at substantially outside temperature. A difference of temperatures of the outer tube and the inner tube produces a thermal stress between them, that changes the natural frequency $\omega_o$ of the inner tube, causing a change of mass flow m and density $\rho$. This results in lowering the measuring accuracy of the flowmeter.

Figure 14:
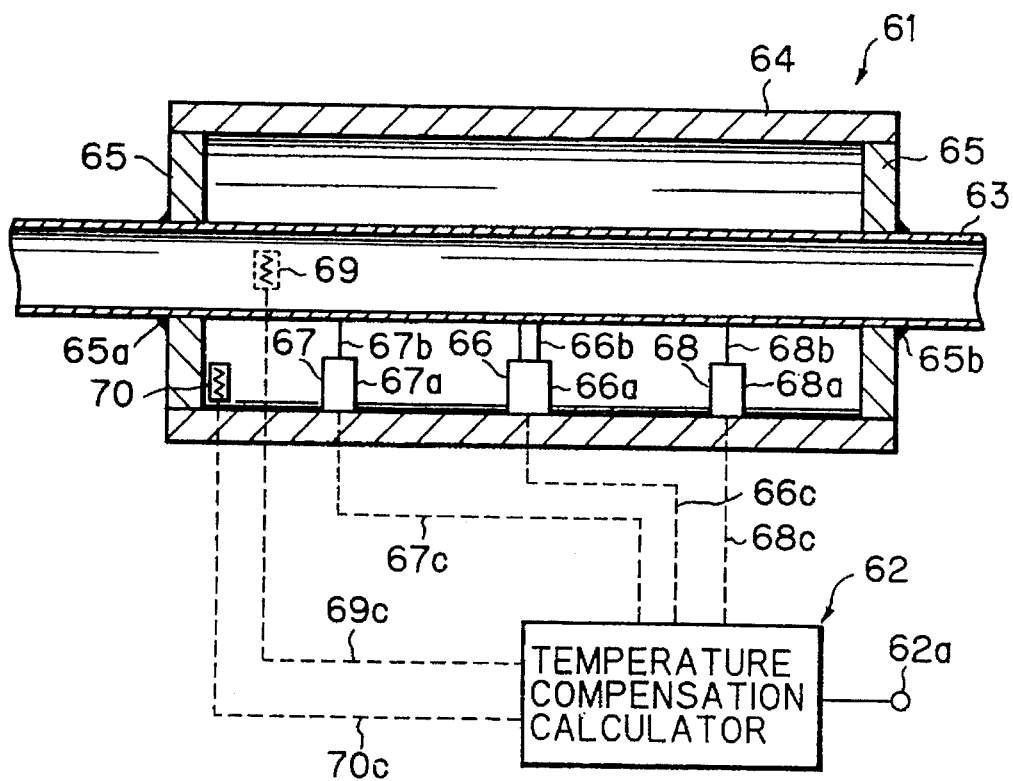
FIG. 14 shows a configuration of an embodiment of a mass flowmeter converter according to the present invention.

FIG. 14 is a cross sectional view showing another embodiment of a mass flowmeter converter according to the present invention. A Coriolis flowmeter 61 has a straight type inner tube 63 and a straight type outer tube 64 enclosing the inner tube 63 and is provided at both ends with connecting ring plates 65 by which the two tubes are coaxially supported. A driving portion 66 is disposed at a center portion on the inner tube 63. Two detecting portions 67 and 68 are arranged symmetrically at both sides of the driving portion 66 on the inner tube 63. An inner temperature sensing element 69 is disposed on the external wall of the inner tube 63 and an outer temperature sensing element 70 is disposed on the internal wall of the outer tube 64. In the thus constructed Coriolis flowmeter 61, the inner tube 63, wherein measurable fluid flows, is driven with by a natural frequency in the direction perpendicular to the axis of the fluid flow by the driving portion 66. A Coriolis force produced on the inner tube being in oscillation is detected by the detecting portions 67 and 68 different in phase directions at respective positions. Detection signals of two detecting portions 67 and 68 are different phase signals.

An arithmetic processing unit 62 for temperature correction is a converter which receives temperature values detected by the inner temperature sensing element 69 and the outer temperature sensing element 70 and a temperature difference value and corrects the mass flow and density for temperature. The driving portion 66, detecting portions 67, 68 and the temperature sensing elements 69, 70 are interconnected with wirings 66c, 67c, 68c, 68c and 70c.

The fluid entering the inner tube 63 may have specific temperature, density and pressure depending upon purpose of its use. The inner tube 63 may change its wall temperature, being thermally influenced by the fluid. Consequently, the inner tube 63 expands or contracts in itself and may change the Young modules. On the other hand, the outer tube 64, which is apart from the inner tube 63 and is exposed to the surrounding air, may not directly be influenced by the heat from the inner tube 63 but is influenced by the temperature of an air layer therebetween. Of course, the larger a difference between outside air temperature and fluid temperature, the greater is a temperature change in the space between the inner tube 63 and the outer tube 64.

Even if the inner tube 63 and the outer tube 64 are made of the same material, a difference of thermal expansion may occur between them. The inner tube, therefore, has thermal stress produced in axial and radial directions thereof, with the result that its natural frequency $\omega_o$ is changed. This change also exerts influence on measured mass flow m. On the other hand, the fluid density $\rho$ is given as a function of mass and spring constant of the inner tube and mass of the fluid. A measured density value $\rho$, therefore, includes an error.

The arithmetic processing unit 62, for temperature correction, calculates temperatures detected by the inner and outer temperature sensing elements 69 and 70 and a temperature difference, determines a correct mass flow m and density $\rho$ free from the error due to temperature effect on the basis of error values of mass flow and density measurements due to temperature difference between the inner and outer tubes 63 and 64, which are previously determined and stored in the CPU and outputs the calculation results through a terminal 62a.

By applying this error correction facility, it is possible to provide a simple, low cost, high accuracy converter enabling the mass flowmeter to use a simple straight flow tube.

In the Coriolis flowmeter shown in FIG. 14, the outer tube 64 has a fairly higher rigidity than the inner tube 63, namely, the outer tube may be considered substantially rigid body when the inner tube is oscillated. On the contrary, the outer tube 64 may have reduced rigidity and is further provided with a weight 64w so that it may have the same natural frequency as the inner tube 63 has. This makes it possible to increase the efficiency and sensitivity of a Coriolis flowmeter which is capable of oscillating its inner tube and outer at the same natural (resonance) frequency. The arithmetic processing unit 62 for temperature error correction according to the present invention may be not only applied to straight-tube type Coriolis flowmeters but is also applied to bent-tube type Coriolis flowmeters.

Figure 15:
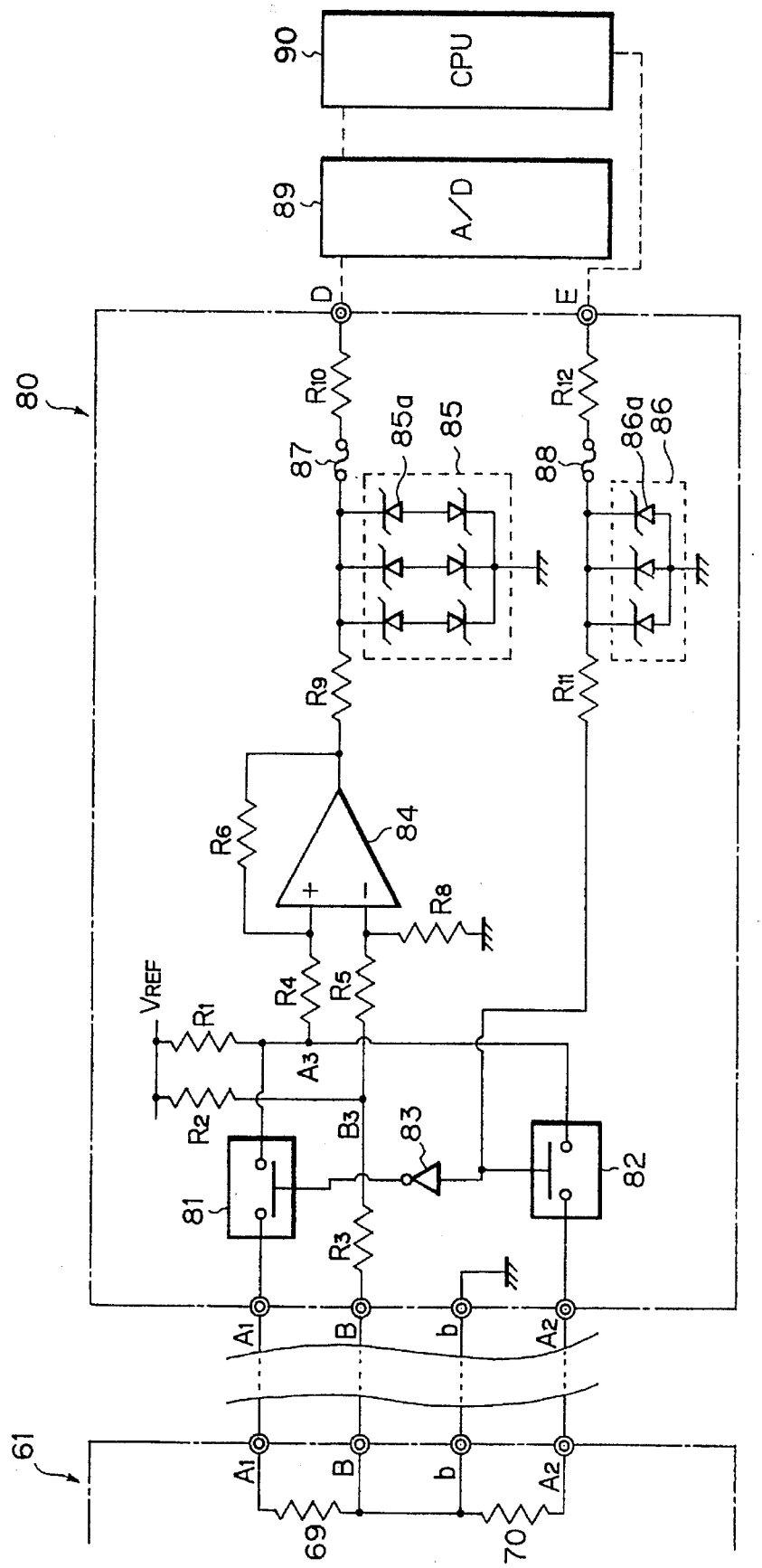
FIG. 15 is a circuit diagram for explaining another embodiment of a mass flowmeter converter according to the present invention.

FIG. 15 is a circuit block diagram of another embodiment of a mass flowmeter converter according to the present invention, which is particularly intended for use in an explosion hazardous area. An inner resistance 69 and an outer resistance 70 are, for example, platinum resistance thermometer bulbs which are disposed at specified positions in a Coriolis flowmeter 61 and switchably connected with each other to form respective arms of a bridge circuit to be described later. The inner resistance 69 is connected with terminals $A_1$, B and the outer resistance 70 is connected with terminals b, $A_2$. A connection point B is connected with another terminal b. They are further connected with respective terminals $A_1$, B, b, $A_2$ of a converter 80. The terminal b is grounded. The Coriolis flowmeter $6_1$ and a signal processing portion 80 are also interconnected by leading wires 66c, 67c and 68c of a driving portion 66 and detecting portions 67, 68 which are omitted for the sake of simplicity of FIG. 15. In practice, the Coriolis flowmeter 61 and the signal processing portion 80 are connected with each other by using a special (multicore) cable. An A/D-converter portion 89 and a CPU 90 are connected with the signal processing portion 80.

The bridge circuit is composed of a resistance $R_1$, the resistance 69 or 70 and resistances $R_2$, $R_3$. The resistances $R_1$ and $R_2$ are connected each at one end with a constant voltage supply source $V_{REF}$, where $R_1=R_2$. In the bridge circuit, the resistances $R_3$, 69 and 70 are each 100 $\Omega$. The inner resistance 69 and the outer resistance 70 are switched by a switch 81 or 82 which is operated by a control signal outputted from a terminal E of the CPU 90. An inverter 83 is disposed between the switches 81 and 82 which operate inversely, one is turned ON while the other is OFF.

A temperature signal is generated between connecting points $A_3$, $B_3$ of the bridge circuit. This temperature signal through input equivalent resistances $R_4$, $R_5$ enters an operational amplifier 84 whereby it is amplified and outputted as an amplified analog temperature signal which is converted into a digital signal by the A/D-converter portion 89. The digital signal is inputted into the CPU 90. The CPU 90 generates a control signal by which temperature signals of the inner tube 63 and the outer tube 64 are switched to new signals which are transferred into the CPU 90. The CPU 90 carries out correction of mass flow and density value measured by the Coriolis flowmeter 61 according to the temperature signals and outputs the corrected values.

According to the present invention, the signal processing portion 80 is made as an intrinsically safe device. A converter circuit shown in FIG. 15 is constructed with switches 81 and 82 for switching the inner resistance 69 and the outer resistance 70. This makes it possible to provide an operational amplifier 84, a zener barrier unit 85 and a fuse 87. A zener barrier unit 86 and a fuse 88 are provided for the control signal from the CPU 90. A constant voltage supply source $V_{REF}$ is also provided with a zener barrier which is not shown for the sake of simplicity of FIG. 15.

According to a general intrinsically safe electrical circuit construction, every sensor requires an operational amplifier, A/D-converter and a zener barrier and wirings, resulting in increase of the quantity of parts and complication of whole system. Accordingly, the present invention is directed to reduce the number of expensive operational amplifiers and zener barriers by providing the switches 81 and 82. The switches 81 and 82 can be freely switched. However, temperature of measurable fluid and temperature of surrounding medium are not always constant, that requires a programmed timing chart for switching the switches 81 and 82. Accordingly, the present invention provides a procedure for switching temperature measurement prepared with due consideration of temperature change.

Figure 16:
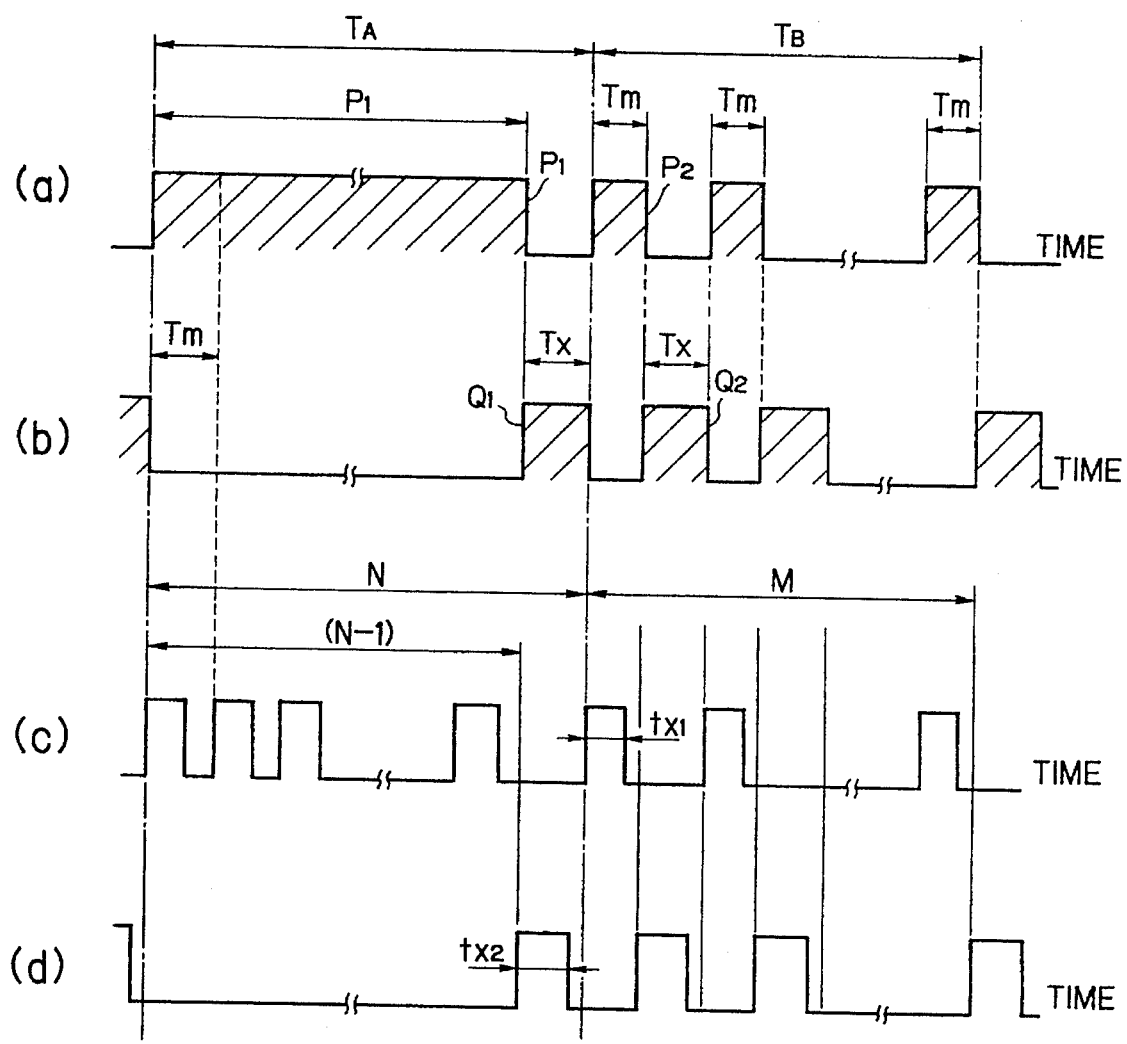
FIG. 16 shows an exemplified time chart of switching the mass flowmeter converter shown in FIG. 15.

FIG. 16 is an example of a switching operation time chart for the mass flowmeter converter shown in FIG. 15. In FIG. 16, $T_A$ indicates a stable state period and $T_B$ shows a switch operation time chart when a temperature difference exceeds a specified value. FIG. 16-(a) shows a pulse P for driving the switch 81 for the inner resistance 69 and FIG. 16-(b) shows a pulse Q for driving the switch 81 for the outer resistance 70. ON state is indicated by hatching. FIG. 16-(c) shows a sampling temperature measuring time $t_{x1}$ for the inner tube 63 and FIG. 16-(d) shows a sampling temperature measuring time $t_{x2}$ for the outer tube 64.

The pulse P width and the pulse Q width may be set at a time determined by the CPU according to the measured temperature difference of the inner tube 63 and the outer tube 64. For example, the pulse P is ON while the pulse Q is OFF. The pulse P is OFF while the pulse Q is ON.

$T_A$ shows a period in which a difference between a temperature of the inner tube 63 and a temperature of the outer tube 64 is stable and kept within a given range. A switching time (pulse width $P_1$) of the switch 81 of the inner tube 63 wherein temperature variation may occur more frequently is set at a time longer than a switching time (pulse width $Q_1$) of the switch 82 of the outer tube 64. This means that the sampling frequency of temperature measurements of the inner tube is increased to control a difference of temperature between the outer tube 64 and the inner tube 63. For example, during the period of the pulse $P_1$, the temperature measurements are carried out with (N–1) times sampling within a time $t_{x1}$ for a time $T_m$ ($T_m > t_{x1}$). At the last switching time, a temperature measurement is conducted for the period $t_{x2}$ during the period $T_x$ ($T_x > t_{x2}$) of the pulse $Q_1$. Namely, temperature measurement on the inside tube is carried 9 times each for sampling duration of $T_m$ for the period of inside pulses $P_1$ and temperature measurement on the outer tube is carried out one for the period $Q_1$ (time $T_x$). If totally 10 temperature measurements are carried out with the result that a temperature difference between the inner tube 63 and outer tube 64 is smaller than the specified value, these operations are determined as one measurement cycle to be repeated.

The period $T_B$ shows the case when a temperature difference between the inner tube and the outer tube exceeds the specified value. The switches 81 and 82 are alternately switched ON at respective pulse duration $T_m$ and $T_x$ and the temperature measurements are conducted each for the time $t_1$ and the time $t_{x2}$ respectively. The measured values of temperature difference are compared with each other. When a temperature difference between the inner tube 63 and outer tube 64 becomes smaller than the specified value, then the measurement cycle (for pulse $P_1$ and pulse $Q_1$ for the stable state period $T_A$) may be restored. However, if a temperature variation exists, the operation is switched immediately to the mode for controlling abnormal temperature difference. To avoid the hunting operation, the switches 81 and 82 are switched to each other by M times in succession. The time is, for example, 25 seconds. The normal measuring cycle may be performed when the temperature difference measured after 25 seconds elapsed is smaller than the specified value. The switching frequency M is an integer and is equal to a ratio of $N_1/N_2$ (the number of switching operations for inside tube 63/the number of switching operations for outside tube 64) or a difference $N_1-N_2$.

Since the temperature measuring means can be selected according to an algorithm based upon a temperature difference between the inner tube 63 and outer tube 64, temperatures of the inner and outer tubes are always measured at a high accuracy and, accordingly, accurate measurements of mass flow and density can be realized.

We claim:

1. A mass flowmeter converter for use in a mass flowmeter wherein a Coriolis force acting on a flow tube driven with a constant frequency about supporting points of said flow tube is detected as a time difference ΔT between displacement signals detected at symmetrically opposed positions on said flow tube at a given time T and a mass flowrate proportional to said time difference ΔT is determined, and in which the displacement signals are converted to lagging and leading pulses having a constant crest value and and respective pulse widths (T+ΔT) and (T–ΔT), the mass flowmeter converter comprising:

a gate circuit which is closed and opened at a specified interval for inputting the lagging and leading pulses;

a first charging and discharging circuit and a second charging and discharging circuit for simultaneously receiving N (N>1) number of leading pulses and lagging pulses respectively through the gate circuit and storing charges thereof, and discharging the charges using a reference voltage source when the gate circuit is open;

a first zero-crossing detecting circuit for detecting a zero crossing of a discharge voltage discharged after charging the first charging and discharging circuit;

a second zero-crossing detecting circuit for detecting a zero crossing of a discharge voltage discharged after charging the second charging and discharging circuit; and means for outputting a mass flowrate proportional to a zero-crossing time difference between the zero crossing detected by the first zero-crossing detector and the zero crossing detected by the second zero-crossing detector.

2. A mass flowmeter converter for use in a mass flowmeter wherein a Coriolis force acting on a flow tube driven with a constant frequency about supporting points of said flow tube is detected as a time difference $\Delta T$ between displacement signals detected at symmetrically opposed positions on said flow tube at a given time T and a mass flowrate proportional to said time difference $\Delta T$ is determined, and in which the displacement signals are converted to lagging and leading pulses having a constant crest value and respective pulse widths $(T+\Delta T)$ and $(T-\Delta T)$, the mass flowmeter converter comprising:

a gate circuit which is closed and opened at a specified interval for inputting the lagging and leading pulses;

a first charging and discharging circuit and a second charging and discharging circuit for simultaneously receiving N (N>1) number of leading pulses and lagging pulses respectively through the gate circuit and storing charges thereof, and discharging the charges using a reference voltage source when the gate circuit is open;

a first zero-crossing detecting circuit for detecting a zero crossing of a discharge voltage discharged after charging the first charging and discharging circuit;

a second zero-crossing detecting circuit for detecting a zero crossing of a discharge voltage discharged after charging the second charging and discharging circuit;

means for outputting a mass flowrate proportional to a zero-crossing time difference between the zero crossing detected by the first zero-crossing detector and the zero crossing detected by the second zero-crossing detector;

an input pulse switching circuit for switching an input of the first charging and discharging circuit from the leading pulses to the lagging pulses and for switching an input of the second charging and discharging circuit from the lagging pulses to the leading pulses; and age deterioration correcting means for correcting a measured mass flowrate in accordance with a deviation of zero-crossing time difference between the zero-crossing time difference obtained by inputting the leading pulses into the first charging and discharging circuit and the lagging pulses into the second charging and discharging circuit and a zero-crossing time difference between a zero-crossing time obtained by inputting the lagging pulses into the first charging and discharging circuit and the leading pulses into the second charging and discharging circuit.

3. A mass flowmeter converter for use in a mass flowmeter wherein a Coriolis force acting on a flow tube driven with a constant frequency about supporting points of said flow tube is detected as a time difference $\Delta T$ between displacement signals detected at symmetrically opposed positions on said flow tube at a given time T and a mass flowrate proportional to said time difference $\Delta T$ is determined, and in which the displacement signals are converted to lagging and leading pulses having a constant crest value and respective pulse widths $(T+\Delta T)$ and $(T-\Delta T)$, the mass flowmeter converter comprising:

a gate circuit which is closed and opened at a specified interval for inputting the lagging and leading pulses;

a first charging and discharging circuit and a second charging and discharging circuit for simultaneously receiving N (N>1) number of leading pulses and lagging pulses respectively through the gate circuit and storing charges thereof, and discharging the charges using a reference voltage source when the gate circuit is open;

a first zero-crossing detecting circuit for detecting a zero crossing of a discharge voltage discharged after charging the first charging and discharging circuit;

a second zero-crossing detecting circuit for detecting a zero crossing of a discharge voltage discharged after charging the second charging and discharging circuit;

an input pulse switching circuit for switching an input of the first charging and discharging circuit from the leading pulses to the lagging pulses and for switching an input of the second charging and discharging circuit from the lagging pulses to the leading pulses;

measuring cycle control means for defining a measuring cycle and for controlling a said input pulse switching circuit to alternate inputs to said first and second charging and discharging circuits each measuring cycle;

time measuring means for measuring and storing a zero-crossing time difference between said detected zero crossings of said first and second zero-crossing detecting circuits each measuring cycle; and adding means for adding zero-crossing time differences detected in two measuring cycle intervals to provide a measurement proportional to said mass flow rate.

4. A mass flowmeter converter for use in a mass flowmeter wherein a Coriolis force acting on a flow tube driven with a resonant frequency about supporting points of said flow tube is detected as a time difference representative of a phase difference between displacement signals detected at symmetrically opposed positions on said flow tube is found, and a mass flowrate proportional to said time difference is determined, the mass flowmeter converter comprising:

a time difference measuring means for measuring the time difference;

frequency measuring means for measuring the resonant frequency;

reciprocal calculating means for calculating a reciprocal number of the resonant frequency measured at the time the time difference is measured; and correction means for correcting the time difference measured based on the reciprocal number of the resonant frequency.

5. A mass flowmeter converter for use in a mass flowmeter wherein a Coriolis force acting on a flow tube driven with a constant frequency about supporting points of said flow tube is detected as a time difference $\Delta T$ between displacement signals detected at symmetrically opposed positions on said flow tube at a given time T and a mass flowrate proportional to said time difference $\Delta T$ is determined, and in which the displacement signals are converted to lagging and leading pulses of opposite polarities having a constant peak to peak value and and respective pulse widths $(T+\Delta T)$ and $(T-\Delta T)$, comprising:

a gate circuit switchable to alternately apply N (N >1) number of said lagging pulses and N (N>1) number of said leading pulses to a gated output;

an integrating circuit, having an input connected to said gated output, for successively integrating the N lagging pulses with the N leading pulses to output an integrated voltage representative of $(T+\Delta T)+(T-\Delta T)$;

a voltage holding circuit for holding the integrated voltage; and and means for calculating a mass flowrate proportional to the integrated voltage.

6. A mass flowmeter converter for use in a Coriolis flowmeter having an inner straight tube wherein fluid flows, an outer straight tube which is a substantially rigid body enclosing and supporting the inner straight tube at both ends of the inner straight tube, and driving means for oscillating the inner straight tube at its natural frequency the mass flowmeter converter comprising:

- means for determining a mass flowrate proportional to a phase difference of signals detected at symmetrically opposite positions close to the respective supporting ends on the inner straight tube;
- means for measuring a natural frequency of the inner straight tube;
- means for measuring temperatures of the inner and outer straight tubes:
- means for determining a fluid density based on the natural frequency of the inner straight tube; and
- means for correcting the determined mass flowrate and fluid density based on measured temperatures of the inner straight tube and the outer straight tube.

7. A mass flowmeter converter for use in a Coriolis flowmeter comprising:

- an inner tube wherein fluid flows and which is substantially straight;
- an outer tube which is substantially straight, coaxially encloses the inner tube and is supported at both ends on the inner tube;
- a weight attached to the outer tube for making the outer tube at its supported ends have a natural frequency equal to a natural frequency of the inner tube;
- driving means for oscillating the inner tube and the outer tube about the supporting positions at a resonant frequency;
- means for determining a mass flowrate proportional to a phase difference detected at symmetrically opposite positions close to the respective supporting ends on the inner tube;
- means for measuring temperatures of the inner and outer tubes; and
- means for determining a fluid density according to the resonant frequency and correcting the determined mass flowrate and fluid density for temperatures of the inner tube and the outer tube.

8. A mass flowmeter converter for use in a Coriolis flowmeter having an inner straight tube wherein fluid flows, an outer straight tube which is a substantially rigid body enclosing and supporting the inner straight tube at both ends of the inner straight tube, and driving means for oscillating the inner straight tube at its natural frequency the mass flowmeter converter comprising:

- means for determining a mass flowrate proportional to a phase difference of signals detected at symmetrically opposite positions close to the respective supporting ends on the inner straight tube;
- means for measuring a natural frequency of the inner straight tube;
- means for measuring temperatures of the inner and outer straight tubes:
- means for determining a fluid density based on the natural frequency of the inner straight tube;
- switching means for switching signals from the means for measuring temperature;
- an amplifier circuit for amplifying a signal from the switching means; and
- a zener barrier unit connected between the amplifier circuit and an external output; and
- a temperature error correcting means for correcting a measured mass flowrate and fluid density on the basis of an output signal through the zener barrier unit.

9. A mass flowmeter converter for use in a Coriolis flowmeter having an inner straight tube wherein fluid flows, an outer straight tube which is a substantially rigid body enclosing and supporting the inner straight tube at both ends of the inner straight tube, and driving means for oscillating the inner straight tube at its natural frequency the mass flowmeter converter comprising:

- means for determining a mass flowrate proportional to a phase difference of signals detected at symmetrically opposite positions close to the respective supporting ends on the inner straight tube;
- means for measuring a natural frequency of the inner straight tube;
- means for measuring temperatures of the inner and outer straight tubes;
- means for determining a fluid density based on the natural frequency of the inner straight tube;
- switching means for switching signals from the means for measuring temperature to continue sensing the temperature of the inner tube while a temperature difference between the inner tube and the outer tube is smaller than a specified value and to alternately measure temperature of the inner tube and temperature of the outer tube when a temperature difference exceeds the specified value; and
- means for correcting the determined mass flowrate and fluid density based on measured temperatures of the inner straight tube and the outer straight tube.

* * * * *